US011762661B2

United States Patent
Brewer

(10) Patent No.: US 11,762,661 B2
(45) Date of Patent: Sep. 19, 2023

(54) COUNTER FOR PREVENTING COMPLETION OF A THREAD INCLUDING A NON-BLOCKING EXTERNAL DEVICE CALL WITH NO-RETURN INDICATION

(71) Applicant: Micron Technology, Inc., Boise, ID (US)

(72) Inventor: Tony M. Brewer, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/386,985

(22) Filed: Jul. 28, 2021

(65) Prior Publication Data
US 2023/0050383 A1    Feb. 16, 2023

(51) Int. Cl.
*G06F 9/38*    (2018.01)
*G06F 9/30*    (2018.01)

(52) U.S. Cl.
CPC ............ *G06F 9/38* (2013.01); *G06F 9/30054* (2013.01)

(58) Field of Classification Search
CPC ....... G06F 9/3004; G06F 9/30054; G06F 9/38
See application file for complete search history.

(56) References Cited

U.S. PATENT DOCUMENTS

| 5,999,987 | A | * | 12/1999 | O'Farrell | ................. G06F 9/547 719/330 |
| 6,957,436 | B1 | * | 10/2005 | Mihic | ..................... G06F 9/465 718/107 |
| 8,122,229 | B2 | | 2/2012 | Wallach et al. | |
| 8,156,307 | B2 | | 4/2012 | Wallach et al. | |
| 8,205,066 | B2 | | 6/2012 | Brewer et al. | |
| 8,423,745 | B1 | | 4/2013 | Brewer | |
| 8,561,037 | B2 | | 10/2013 | Brewer et al. | |
| 9,710,384 | B2 | | 7/2017 | Wallach et al. | |
| 10,990,391 | B2 | | 4/2021 | Brewer | |
| 10,990,392 | B2 | | 4/2021 | Brewer | |
| 2008/0244247 | A1 | * | 10/2008 | Berglas | ................. G06F 9/3836 712/228 |

(Continued)

FOREIGN PATENT DOCUMENTS

| WO | 2010051167 | 5/2010 |
| WO | 2013184380 | 12/2013 |

(Continued)

OTHER PUBLICATIONS

Stack Overflow, "file read error: success", Jan. 31, 2011, 2 pages. Retrieved from the Internet < URL: https://stackoverflow.com/questions/4847725/file-read-error-success >.*

*Primary Examiner* — David J. Huisman
(74) *Attorney, Agent, or Firm* — Schwegman Lundberg & Woessner, P.A.

(57) ABSTRACT

Devices and techniques for non-blocking external device calls are described herein. Specifically, when a processor receives an instruction with a no-return indication from a thread for a device, the processor can increase a counter corresponding to the thread based on the no-return indication. The processor can then continue execution of the thread without waiting for a return value from the device. When a return value is received for the instruction, the processor can decrement the counter. While the counter is not zero, the processor prevents the thread from completing (exiting).

24 Claims, 12 Drawing Sheets

(56) References Cited

U.S. PATENT DOCUMENTS

| | | |
|---|---|---|
| 2008/0270708 A1 | 10/2008 | Warner et al. |
| 2012/0079177 A1 | 3/2012 | Brewer et al. |
| 2013/0332711 A1* | 12/2013 | Leidel ................ G06F 9/30167 712/227 |
| 2015/0143350 A1 | 5/2015 | Brewer |
| 2015/0206561 A1 | 7/2015 | Brewer et al. |
| 2016/0142422 A1* | 5/2016 | Fiorentino .......... G06F 11/1492 726/23 |
| 2018/0024951 A1* | 1/2018 | Edmiston .............. G06F 9/4881 718/104 |
| 2019/0042214 A1 | 2/2019 | Brewer |
| 2019/0171604 A1 | 6/2019 | Brewer |
| 2019/0243700 A1 | 8/2019 | Brewer |
| 2019/0303154 A1 | 10/2019 | Brewer |
| 2019/0324928 A1 | 10/2019 | Brewer |
| 2019/0340019 A1 | 11/2019 | Brewer |
| 2019/0340020 A1 | 11/2019 | Brewer |
| 2019/0340023 A1 | 11/2019 | Brewer |
| 2019/0340024 A1 | 11/2019 | Brewer |
| 2019/0340027 A1 | 11/2019 | Brewer |
| 2019/0340035 A1 | 11/2019 | Brewer |
| 2019/0340154 A1 | 11/2019 | Brewer |
| 2019/0340155 A1 | 11/2019 | Brewer |
| 2021/0055964 A1 | 2/2021 | Brewer |
| 2021/0064374 A1 | 3/2021 | Brewer |
| 2021/0064435 A1 | 3/2021 | Brewer |
| 2021/0149600 A1 | 5/2021 | Brewer |

FOREIGN PATENT DOCUMENTS

| | | |
|---|---|---|
| WO | 2019191740 | 10/2019 |
| WO | 2019191742 | 10/2019 |
| WO | 2019191744 | 10/2019 |
| WO | 2019217287 | 11/2019 |
| WO | 2019217295 | 11/2019 |
| WO | 2019217324 | 11/2019 |
| WO | 2019217326 | 11/2019 |
| WO | 2019217329 | 11/2019 |
| WO | 2019089816 | 4/2020 |

* cited by examiner

COUNTER FOR PREVENTING COMPLETION OF A THREAD INCLUDING A NON-BLOCKING EXTERNAL DEVICE CALL WITH NO-RETURN INDICATION

BACKGROUND

Various computer architectures, such as the Von Neumann architecture, conventionally use a shared memory for data, a bus for accessing the shared memory, an arithmetic unit, and a program control unit. However, moving data between processors and memory can require significant time and energy, which in turn can constrain performance and capacity of computer systems. In view of these limitations, new computing architectures and devices are desired to advance computing performance beyond the practice of transistor scaling (i.e., Moore's Law).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
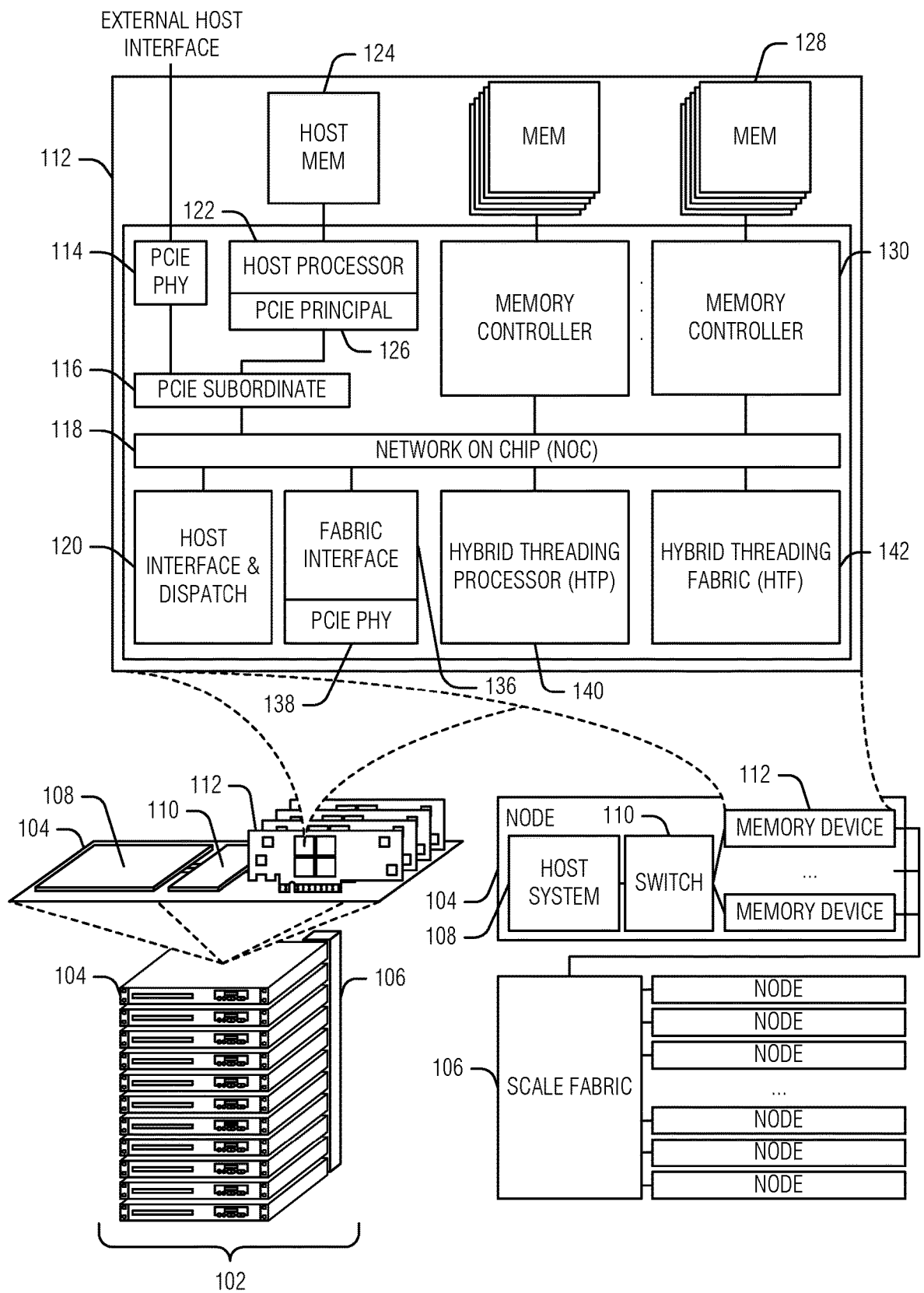
FIG. 1 illustrates generally a first example of a first memory-compute device in the context of a memory-compute system, according to an embodiment.

Recent advances in materials, devices, and integration technology, can be leveraged to provide memory-centric compute topologies. Such topologies can realize advances in compute efficiency and workload throughput, for example, for applications constrained by size, weight, or power requirements. The topologies can be used to facilitate low-latency compute near, or inside of, memory or other data storage elements. The approaches can be particularly well-suited for various compute-intensive operations with sparse lookups, such as in transform computations (e.g., fast Fourier transform computations (FFT)), or in applications such as neural networks or artificial intelligence (AI), financial analytics, or simulations or modeling such as for computational fluid dynamics (CFD), Enhanced Acoustic Simulator for Engineers (EASE), Simulation Program with Integrated Circuit Emphasis (SPICE), and others.

Systems, devices, and methods discussed herein can include or use memory-compute systems with processors, or processing capabilities, that are provided in, near, or integrated with memory or data storage components. Such systems are referred to generally herein as compute-near-memory (CNM) systems. A CNM system can be a node-based system with individual nodes in the systems coupled using a system scale fabric. Each node can include or use specialized or general purpose processors, and user-accessible accelerators, with a custom compute fabric to facilitate intensive operations, particularly in environments where high cache miss rates are expected.

In an example, each node in a CNM system can have a host processor or processors. Within each node, a dedicated hybrid threading processor can occupy a discrete endpoint of an on-chip network. The hybrid threading processor can have access to some or all of the memory in a particular node of the system, or a hybrid threading processor can have access to memories across a network of multiple nodes via the system scale fabric. The custom compute fabric, or hybrid threading fabric, at each node can have its own processor(s) or accelerator(s) and can operate at higher bandwidth than the hybrid threading processor. Different nodes in a compute-near-memory system can be differently configured, such as having different compute capabilities, different types of memories, different interfaces, or other differences. However, the nodes can be commonly coupled to share data and compute resources within a defined address space.

In an example, a compute-near-memory system, or a node within the system, can be user-configured for custom operations. A user can provide instructions using a high-level programming language, such as C/C++, that can be compiled and mapped directly into a dataflow architecture of the system, or of one or more nodes in the CNM system. That is, the nodes in the system can include hardware blocks (e.g., memory controllers, atomic units, other customer accelerators, etc.) that can be configured to directly implement or support user instructions to thereby enhance system performance and reduce latency.

In an example, a compute-near-memory system can be particularly suited for implementing a hierarchy of instructions and nested loops (e.g., two, three, or more, loops deep, or multiple-dimensional loops). A standard compiler can be used to accept high-level language instructions and, in turn, compile directly into the dataflow architecture of one or more of the nodes. For example, a node in the system can include a hybrid threading fabric accelerator. The hybrid threading fabric accelerator can execute in a user space of the CNM system and can initiate its own threads or sub-threads, which can operate in parallel. Each thread can map to a different loop iteration to thereby support multi-dimensional loops. With the capability to initiate such nested loops, among other capabilities, the CNM system can realize significant time savings and latency improvements for compute-intensive operations.

Figure 8A:
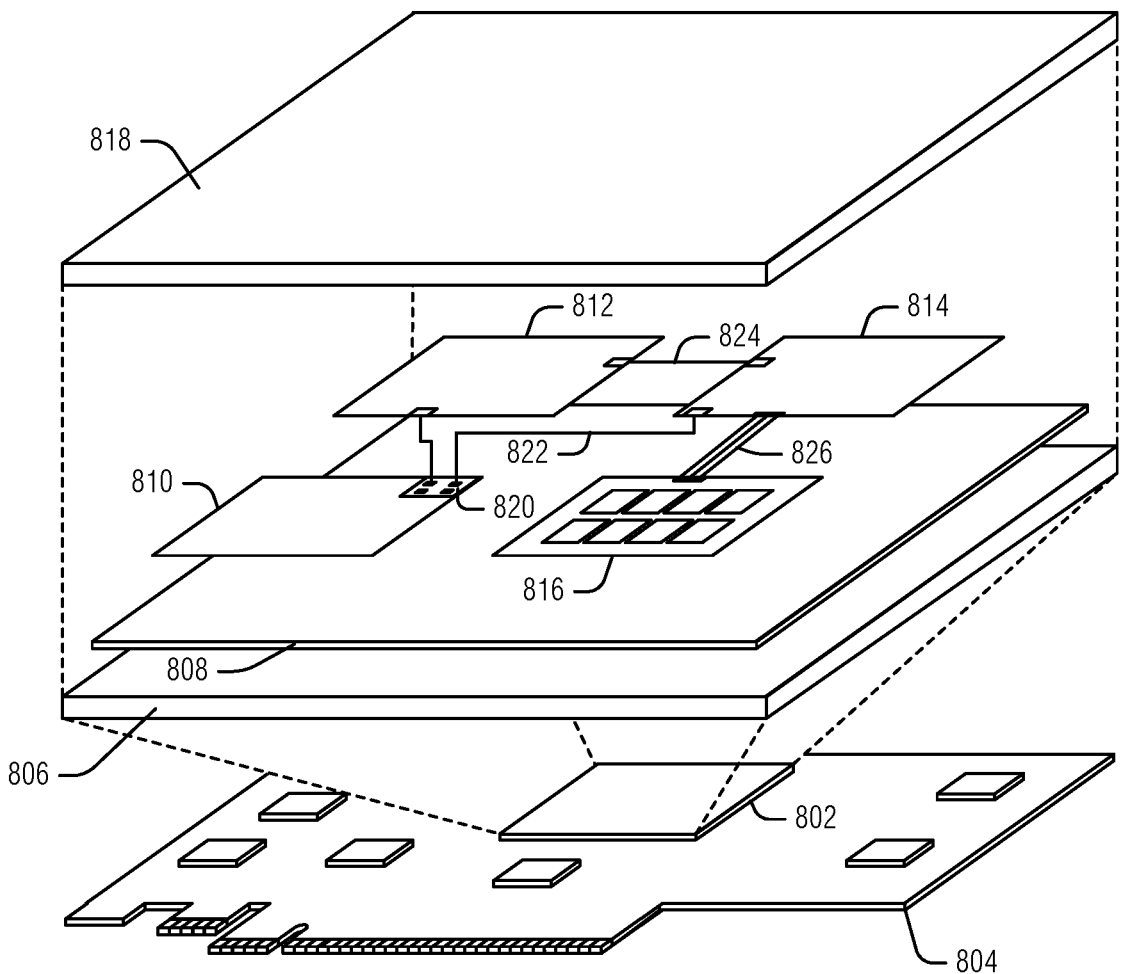
FIG. 8A illustrates generally an example of a chiplet system, according to an embodiment.
Figure 8B:
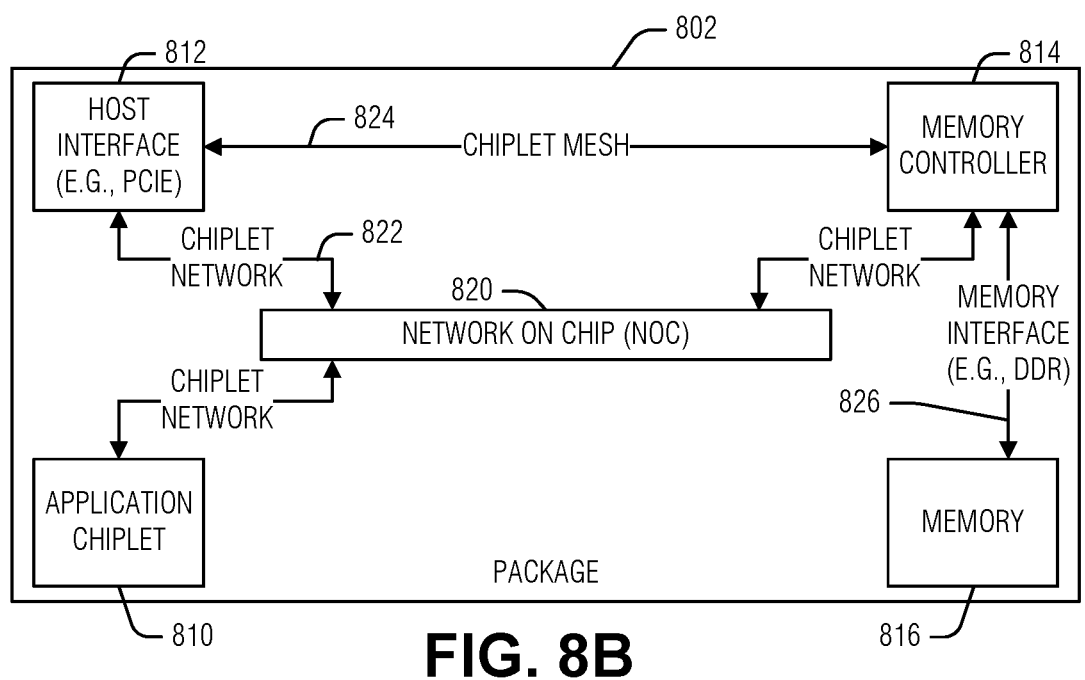
FIG. 8B illustrates generally a block diagram showing various components in the chiplet system from the example of FIG. 8A.

A compute-near-memory system, or nodes or components of a compute-near-memory system, can include or use various memory devices, controllers, and interconnects, among other things. In an example, the system can comprise various interconnected nodes and the nodes, or groups of nodes, can be implemented using chiplets. Chiplets are an emerging technique for integrating various processing functionality. Generally, a chiplet system is made up of discrete chips (e.g., integrated circuits (ICs) on different substrate or die) that are integrated on an interposer and packaged together. This arrangement is distinct from single chips (e.g., ICs) that contain distinct device blocks (e.g., intellectual property (IP) blocks) on one substrate (e.g., single die), such as a system-on-a-chip (SoC), or discretely packaged devices integrated on a board. In general, chiplets provide production benefits than single die chips, including higher yields or reduced development costs. FIG. 8A and FIG. 8B, discussed below, illustrate generally an example of a chiplet system such as can comprise a compute-near-memory system.

A variety of components that can make up the compute-near-memory system described herein are processors configured to execute threads that interact with other components of the compute-near-memory system. For example, a thread executing on an HTP can execute an atomic operation on a memory controller (on the same node or a different node) to modify a value in memory managed by the memory controller. Generally, such interactions involve the thread making a call to the device (e.g., the memory controller) and blocking while awaiting a response from the device. Often, once the response is received, the response is written into a target register of the processor and the thread resumes execution. Thus, while the call is being processed by the device, the thread is not doing useful work.

The traditional suspension of thread activity during external device calls is often necessary when, for example, subsequent instructions of the thread depend upon the data returned by the call. Thus, if a value needs to be retrieved from memory to perform a subsequent calculation by the thread, then the thread must wait until the value is returned before executing the subsequent instruction to operate correctly. However, there are situations when subsequent thread operations are not dependent upon the result of the call to the device. For example, if a running total of the number of sensor samples processed is maintained, each thread processing a sensor sample can call an atomic operation at a memory controller to add one to the running total. Here, once the call is sent, subsequent operations of the thread are indifferent to the actual value of the running count. In scenarios such as these, blocking the thread upon the call simply slows execution of the thread without benefit. To address these situations, a thread can indicate whether or not the return from the external device call will be used. If the thread indicates that the return value will be used, a traditional stall, suspension, or blocking of the thread by the processor can be used while awaiting the return. However, if the thread indicates that the return will not be used (e.g., a no-return, non-blocking, etc. request, call, or instruction), then the processor can enable the thread to continue executing (e.g., immediately reschedule the thread) after the remote device call (e.g., request) without waiting for the return. In other words, the thread can execute irrespective of the return value. In systems with many running threads, such as is possible in the compute-near-memory systems described herein, enabling threads to continue execution after non-blocking calls can provide significant reductions in thread idle times, increasing processing throughput on the hardware.

Even when the calling thread doesn't need a return value, ensuring that the call to the external device is completed can be important between threads. That is, allowing a thread to exit, thus appearing to have completed all its work, while non-blocking calls are still running, can lead to incorrect software behavior.

To address this issue, the processor can maintain a pending no-return counter that indicates how many no-return memory accesses have yet to provide a response. Thus, a thread can immediately execute the next instruction after making any no-return call, but is prevented from exiting (e.g., executing a thread return instruction (ETR)) until all no-return access responses are received by the processor. Thus, traditional dependencies on the responses to external device (e.g., memory access) instructions-which can cause significant performance degradation—are avoided while maintaining data consistency to actors outside of the thread.

In the additional details and examples described below, the HTP (e.g., HTP accelerator 400 illustrated in FIG. 4) is used an as example processor implementing the pending no-return counter. However, any processing circuitry (e.g., those described with respect to FIG. 1-3, 7-8B, or 12) that influences the execution of threads and thread calls to external devices can implement the devices and techniques for no-return calls or the pending no-return counter described herein.

FIG. 1 illustrates generally a first example of a compute-near-memory system, or CNM system 102. The example of the CNM system 102 includes multiple different memory-compute nodes, such as can each include various compute-near-memory devices. Each node in the system can operate in its own operating system (OS) domain (e.g., Linux, among others). In an example, the nodes can exist collectively in a common OS domain of the CNM system 102.

The example of FIG. 1 includes an example of a first memory-compute node 104 of the CNM system 102. The CNM system 102 can have multiple nodes, such as including different instances of the first memory-compute node 104, that are coupled using a scale fabric 106. In an example, the architecture of the CNM system 102 can support scaling with up to n different memory-compute nodes (e.g., n=4096) using the scale fabric 106. As further discussed below, each node in the CNM system 102 can be an assembly of multiple devices.

The CNM system 102 can include a global controller for the various nodes in the system, or a particular memory-compute node in the system can optionally serve as a host or controller to one or multiple other memory-compute nodes in the same system. The various nodes in the CNM system 102 can thus be similarly or differently configured.

In an example, each node in the CNM system 102 can comprise a host system that uses a specified operating system. The operating system can be common or different among the various nodes in the CNM system 102. In the example of FIG. 1, the first memory-compute node 104 comprises a host system 108, a first switch 110, and a first memory-compute device 112. The host system 108 can comprise a processor, such as can include an X86, ARM, RISC-V, or other type of processor. The first switch 110 can be configured to facilitate communication between or among devices of the first memory-compute node 104 or of the CNM system 102, such as using a specialized or other communication protocol, generally referred to herein as a chip-to-chip protocol interface (CTCPI). That is, the CTCPI can include a specialized interface that is unique to the CNM system 102, or can include or use other interfaces such as the compute express link (CXL) interface, the peripheral component interconnect express (PCIe) interface, or the chiplet protocol interface (CPI), among others. The first switch 110 can include a switch configured to use the CTCPI. For example, the first switch 110 can include a CXL switch, a PCIe switch, a CPI switch, or other type of switch. In an example, the first switch 110 can be configured to couple differently configured endpoints. For example, the first switch 110 can be configured to convert packet formats, such as between PCIe and CPI formats, among others.

The CNM system 102 is described herein in various example configurations, such as comprising a system of nodes, and each node can comprise various chips (e.g., a processor, a switch, a memory device, etc.). In an example, the first memory-compute node 104 in the CNM system 102 can include various chips implemented using chiplets. In the below-discussed chiplet-based configuration of the CNM system 102, inter-chiplet communications, as well as additional communications within the system, can use a CPI network. The CPI network described herein is an example of the CTCPI, that is, as a chiplet-specific implementation of the CTCPI. As a result, the below-described structure, operations, and functionality of CPI can apply equally to structures, operations, and functions as may be otherwise implemented using non-chiplet-based CTCPI implementations. Unless expressly indicated otherwise, any discussion herein of CPI applies equally to CTCPI.

A CPI interface includes a packet-based network that supports virtual channels to enable a flexible and high-speed interaction between chiplets, such as can comprise portions of the first memory-compute node 104 or the CNM system 102. The CPI can enable bridging from intra-chiplet networks to a broader chiplet network. For example, the Advanced eXtensible Interface (AXI) is a specification for intra-chip communications. AXI specifications, however, cover a variety of physical design options, such as the number of physical channels, signal timing, power, etc. Within a single chip, these options are generally selected to meet design goals, such as power consumption, speed, etc. However, to achieve the flexibility of a chiplet-based memory-compute system, an adapter, such as using CPI, can interface between the various AXI design options that can be implemented in the various chiplets. By enabling a physical channel-to-virtual channel mapping and encapsulating time-based signaling with a packetized protocol, CPI can be used to bridge intra-chiplet networks, such as within a particular memory-compute node, across a broader chiplet network, such as across the first memory-compute node 104 or across the CNM system 102.

The CNM system 102 is scalable to include multiple-node configurations. That is, multiple different instances of the first memory-compute node 104, or of other differently configured memory-compute nodes, can be coupled using the scale fabric 106, to provide a scaled system. Each of the memory-compute nodes can run its own operating system and can be configured to jointly coordinate system-wide resource usage.

In the example of FIG. 1, the first switch 110 of the first memory-compute node 104 is coupled to the scale fabric 106. The scale fabric 106 can provide a switch (e.g., a CTCPI switch, a PCIe switch, a CPI switch, or other switch) that can facilitate communication among and between different memory-compute nodes. In an example, the scale fabric 106 can help various nodes communicate in a partitioned global address space (PGAS).

In an example, the first switch 110 from the first memory-compute node 104 is coupled to one or multiple different memory-compute devices, such as including the first memory-compute device 112. The first memory-compute device 112 can comprise a chiplet-based architecture referred to herein as a compute-near-memory (CNM) chiplet. A packaged version of the first memory-compute device 112 can include, for example, one or multiple CNM chiplets. The chiplets can be communicatively coupled using CTCPI for high bandwidth and low latency.

In the example of FIG. 1, the first memory-compute device 112 can include a network on chip (NOC) or first NOC 118. Generally, a NOC is an interconnection network within a device, connecting a particular set of endpoints. In FIG. 1, the first NOC 118 can provide communications and connectivity between the various memory, compute resources, and ports of the first memory-compute device 112.

In an example, the first NOC 118 can comprise a folded Clos topology, such as within each instance of a memory-compute device, or as a mesh that couples multiple memory-compute devices in a node. The Clos topology, such as can use multiple, smaller radix crossbars to provide functionality associated with a higher radix crossbar topology, offers various benefits. For example, the Clos topology can exhibit consistent latency and bisection bandwidth across the NOC.

The first NOC 118 can include various distinct switch types including hub switches, edge switches, and endpoint switches. Each of the switches can be constructed as crossbars that provide substantially uniform latency and bandwidth between input and output nodes. In an example, the endpoint switches and the edge switches can include two separate crossbars, one for traffic headed to the hub switches, and the other for traffic headed away from the hub switches. The hub switches can be constructed as a single crossbar that switches all inputs to all outputs.

In an example, the hub switches can have multiple ports each (e.g., four or six ports each), such as depending on whether the particular hub switch participates in inter-chip communications. A number of hub switches that participates in inter-chip communications can be set by an inter-chip bandwidth requirement.

The first NOC 118 can support various payloads (e.g., from 8 to 64-byte payloads; other payload sizes can similarly be used) between compute elements and memory. In an example, the first NOC 118 can be optimized for relatively smaller payloads (e.g., 8-16 bytes) to efficiently handle access to sparse data structures.

In an example, the first NOC 118 can be coupled to an external host via a first physical-layer interface 114, a PCIe subordinate module 116 or endpoint, and a PCIe principal module 126 or root port. That is, the first physical-layer interface 114 can include an interface to allow an external host processor to be coupled to the first memory-compute device 112. An external host processor can optionally be coupled to one or multiple different memory-compute devices, such as using a PCIe switch or other, native protocol switch. Communication with the external host processor through a PCIe-based switch can limit device-to-device communication to that supported by the switch. Communication through a memory-compute device-native protocol switch such as using CTCPI, in contrast, can allow for more full communication between or among different memory-compute devices, including support for a partitioned global address space, such as for creating threads of work and sending events.

In an example, the CTCPI protocol can be used by the first NOC 118 in the first memory-compute device 112, and the first switch 110 can include a CTCPI switch. The CTCPI switch can allow CTCPI packets to be transferred from a source memory-compute device, such as the first memory-compute device 112, to a different, destination memory-compute device (e.g., on the same or other node), such as without being converted to another packet format.

In an example, the first memory-compute device 112 can include an internal host processor 122. The internal host processor 122 can be configured to communicate with the first NOC 118 or other components or modules of the first memory-compute device 112, for example, using the internal PCIe principal module 126, which can help eliminate a physical layer that would consume time and energy. In an example, the internal host processor 122 can be based on a RISC-V ISA processor, and can use the first physical-layer interface 114 to communicate outside of the first memory-compute device 112, such as to other storage, networking, or other peripherals to the first memory-compute device 112. The internal host processor 122 can control the first memory-compute device 112 and can act as a proxy for operating system-related functionality. The internal host processor 122 can include a relatively small number of processing cores (e.g., 2-4 cores) and a host memory device 124 (e.g., comprising a DRAM module).

In an example, the internal host processor 122 can include PCI root ports. When the internal host processor 122 is in use, then one of its root ports can be connected to the PCIe subordinate module 116. Another of the root ports of the internal host processor 122 can be connected to the first physical-layer interface 114, such as to provide communication with external PCI peripherals. When the internal host processor 122 is disabled, then the PCIe subordinate module 116 can be coupled to the first physical-layer interface 114 to allow an external host processor to communicate with the first NOC 118. In an example of a system with multiple memory-compute devices, the first memory-compute device 112 can be configured to act as a system host or controller. In this example, the internal host processor 122 can be in use, and other instances of internal host processors in the respective other memory-compute devices can be disabled.

The internal host processor 122 can be configured at power-up of the first memory-compute device 112, such as to allow the host to initialize. In an example, the internal host processor 122 and its associated data paths (e.g., including the first physical-layer interface 114, the PCIe subordinate module 116, etc.) can be configured from input pins to the first memory-compute device 112. One or more of the pins can be used to enable or disable the internal host processor 122 and configure the PCI (or other) data paths accordingly.

In an example, the first NOC 118 can be coupled to the scale fabric 106 via a scale fabric interface module 136 and a second physical-layer interface 138. The scale fabric interface module 136, or SIF, can facilitate communication between the first memory-compute device 112 and a device space, such as a partitioned global address space (PGAS). The PGAS can be configured such that a particular memory-compute device, such as the first memory-compute device 112, can access memory or other resources on a different memory-compute device (e.g., on the same or different node), such as using a load/store paradigm. Various scalable fabric technologies can be used, including CTCPI, CPI, Gen-Z, PCI, or Ethernet bridged over CXL. The scale fabric 106 can be configured to support various packet formats. In an example, the scale fabric 106 supports orderless packet communications, or supports ordered packets such as can use a path identifier to spread bandwidth across multiple equivalent paths. The scale fabric 106 can generally support remote operations such as remote memory read, write, and other built-in atomics, remote memory atomics, remote memory-compute device send events, and remote memory-compute device call and return operations.

In an example, the first NOC 118 can be coupled to one or multiple different memory modules, such as including a first memory device 128. The first memory device 128 can include various kinds of memory devices, for example, LPDDR5 or GDDR6, among others. In the example of FIG. 1, the first NOC 118 can coordinate communications with the first memory device 128 via a memory controller 130 that can be dedicated to the particular memory module. In an example, the memory controller 130 can include a memory module cache and an atomic operations module. The atomic operations module can be configured to provide relatively high-throughput atomic operators, such as including integer and floating-point operators. The atomic operations module can be configured to apply its operators to data within the memory module cache (e.g., comprising SRAM memory side cache), thereby allowing back-to-back atomic operations using the same memory location, with minimal throughput degradation.

The memory module cache can provide storage for frequently accessed memory locations, such as without having to re-access the first memory device 128. In an example, the memory module cache can be configured to cache data only for a particular instance of the memory controller 130. In an example, the memory controller 130 includes a DRAM controller configured to interface with the first memory device 128, such as including DRAM devices. The memory controller 130 can provide access scheduling and bit error management, among other functions.

In an example, the first NOC 118 can be coupled to a hybrid threading processor (HTP 140), a hybrid threading fabric (HTF 142) and a host interface and dispatch module (HIF 120). The HIF 120 can be configured to facilitate access to host-based command request queues and response queues. In an example, the HIF 120 can dispatch new threads of execution on processor or compute elements of the HTP 140 or the HTF 142. In an example, the HIF 120 can be configured to maintain workload balance across the HTP 140 module and the HTF 142 module.

The hybrid threading processor, or HTP 140, can include an accelerator, such as can be based on a RISC-V instruction set. The HTP 140 can include a highly threaded, event-driven processor in which threads can be executed in single instruction rotation, such as to maintain high instruction throughput. The HTP 140 comprises relatively few custom instructions to support low-overhead threading capabilities, event send/receive, and shared memory atomic operators.

The hybrid threading fabric, or HTF 142, can include an accelerator, such as can include a non-von Neumann, coarse-grained, reconfigurable processor. The HTF 142 can be optimized for high-level language operations and data types (e.g., integer or floating point). In an example, the HTF 142 can support data flow computing. The HTF 142 can be configured to use substantially all of the memory bandwidth available on the first memory-compute device 112, such as when executing memory-bound compute kernels.

The HTP and HTF accelerators of the CNM system 102 can be programmed using various high-level, structured programming languages. For example, the HTP and HTF accelerators can be programmed using C/C++, such as using the LLVM compiler framework. The HTP accelerator can leverage an open source compiler environment, such as with various added custom instruction sets configured to improve memory access efficiency, provide a message passing mechanism, and manage events, among other things. In an example, the HTF accelerator can be designed to enable programming of the HTF 142 using a high-level programming language, and the compiler can generate a simulator configuration file or a binary file that runs on the HTF 142 hardware. The HTF 142 can provide a mid-level language for expressing algorithms precisely and concisely, while hiding configuration details of the HTF accelerator itself. In an example, the HTF accelerator tool chain can use an LLVM front-end compiler and the LLVM intermediate representation (IR) to interface with an HTF accelerator back end.

Figure 2:
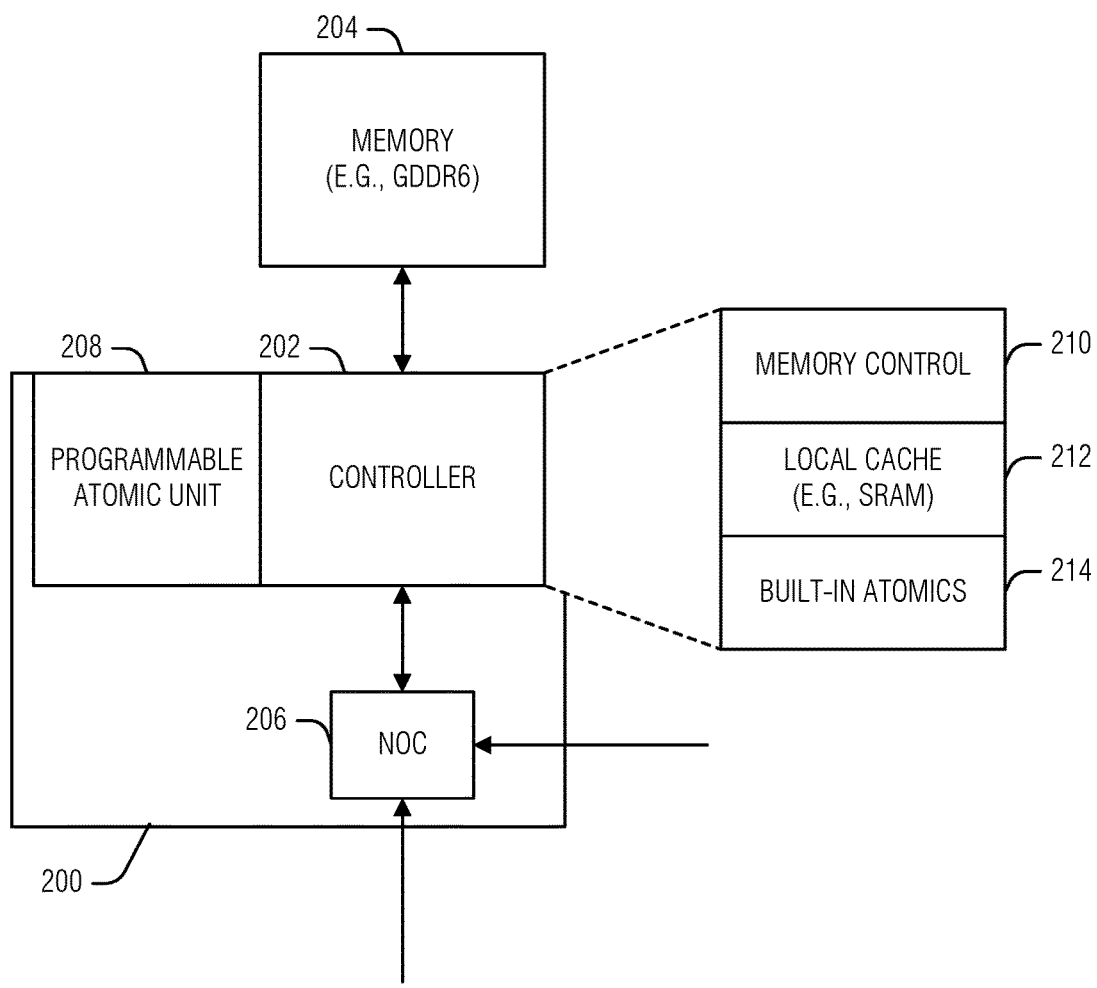
FIG. 2 illustrates generally an example of a memory subsystem of a memory-compute device, according to an embodiment.

FIG. 2 illustrates generally an example of a memory subsystem 200 of a memory-compute device, according to an embodiment. The example of the memory subsystem 200 includes a controller 202, a programmable atomic unit 208, and a second NOC 206. The controller 202 can include or use the programmable atomic unit 208 to carry out operations using information in a memory device 204. In an example, the memory subsystem 200 comprises a portion of the first memory-compute device 112 from the example of FIG. 1, such as including portions of the first NOC 118 or of the memory controller 130.

In the example of FIG. 2, the second NOC 206 is coupled to the controller 202 and the controller 202 can include a memory control module 210, a local cache module 212, and a built-in atomics module 214. In an example, the built-in atomics module 214 can be configured to handle relatively simple, single-cycle, integer atomics. The built-in atomics module 214 can perform atomics at the same throughput as, for example, normal memory read or write operations. In an example, an atomic memory operation can include a combination of storing data to the memory, performing an atomic memory operation, and then responding with load data from the memory.

The local cache module 212, such as can include an SRAM cache, can be provided to help reduce latency for repetitively-accessed memory locations. In an example, the local cache module 212 can provide a read buffer for sub-memory line accesses. The local cache module 212 can be particularly beneficial for compute elements that have relatively small or no data caches.

The memory control module 210, such as can include a DRAM controller, can provide low-level request buffering and scheduling, such as to provide efficient access to the memory device 204, such as can include a DRAM device. In an example, the memory device 204 can include or use a GDDR6 DRAM device, such as having 16 Gb density and 64 Gb/sec peak bandwidth. Other devices can similarly be used.

In an example, the programmable atomic unit 208 can comprise single-cycle or multiple-cycle operator such as can be configured to perform integer addition or more complicated multiple-instruction operations such as bloom filter insert. In an example, the programmable atomic unit 208 can be configured to perform load and store-to-memory operations. The programmable atomic unit 208 can be configured to leverage the RISC-V ISA with a set of specialized instructions to facilitate interactions with the controller 202 to atomically perform user-defined operations.

Programmable atomic requests, such as received from an on-node or off-node host, can be routed to the programmable atomic unit 208 via the second NOC 206 and the controller 202. In an example, custom atomic operations (e.g., carried out by the programmable atomic unit 208) can be identical to built-in atomic operations (e.g., carried out by the built-in atomics module 214) except that a programmable atomic operation can be defined or programmed by the user rather than the system architect. In an example, programmable atomic request packets can be sent through the second NOC 206 to the controller 202, and the controller 202 can identify the request as a custom atomic. The controller 202 can then forward the identified request to the programmable atomic unit 208.

Figure 3:
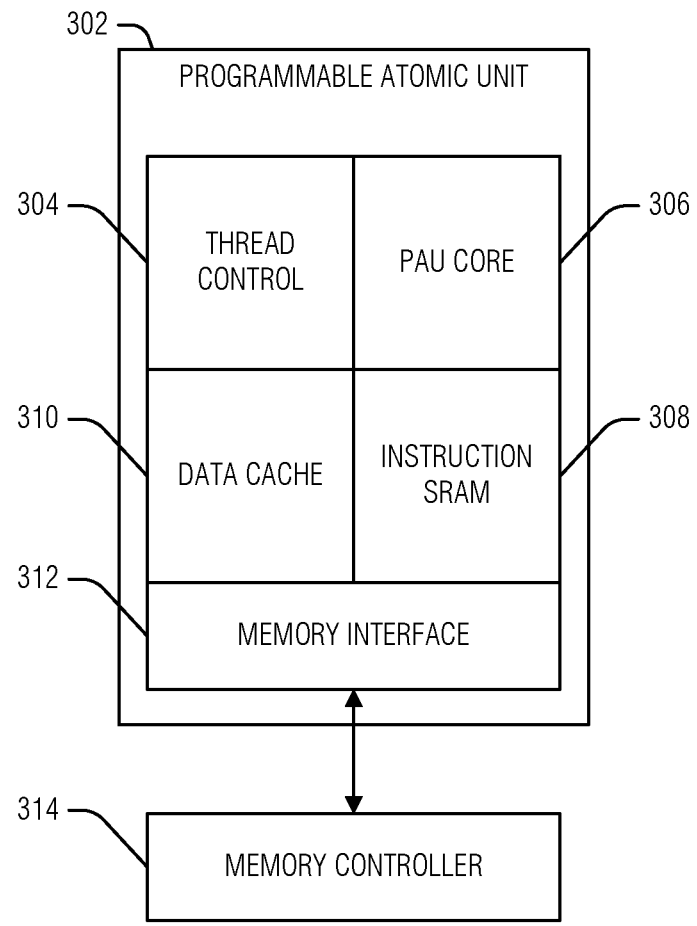
FIG. 3 illustrates generally an example of a programmable atomic unit for a memory controller, according to an embodiment.

FIG. 3 illustrates generally an example of a programmable atomic unit 302 for use with a memory controller, according to an embodiment. In an example, the programmable atomic unit 302 can comprise or correspond to the programmable atomic unit 208 from the example of FIG. 2. That is, FIG. 3 illustrates components in an example of a programmable atomic unit 302 (PAU), such as those noted above with respect to FIG. 2 (e.g., in the programmable atomic unit 208), or to FIG. 1 (e.g., in an atomic operations module of the memory controller 130). As illustrated in FIG. 3, the programmable atomic unit 302 includes a PAU processor or PAU core 306, a PAU thread control 304, an instruction SRAM 308, a data cache 310, and a memory interface 312 to interface with the memory controller 314. In an example, the memory controller 314 comprises an example of the controller 202 from the example of FIG. 2.

In an example, the PAU core 306 is a pipelined processor such that multiple stages of different instructions are executed together per clock cycle. The PAU core 306 can include a barrel-multithreaded processor, with thread control 304 circuitry to switch between different register files (e.g., sets of registers containing current processing state) upon each clock cycle. This enables efficient context switching between currently executing threads. In an example, the PAU core 306 supports eight threads, resulting in eight register files. In an example, some or all of the register files are not integrated into the PAU core 306, but rather reside in a local data cache 310 or the instruction SRAM 308. This reduces circuit complexity in the PAU core 306 by eliminating the traditional flip-flops used for registers in such memories.

The local PAU memory can include instruction SRAM 308, such as can include instructions for various atomics. The instructions comprise sets of instructions to support various application-loaded atomic operators. When an atomic operator is requested, such as by an application chiplet, a set of instructions corresponding to the atomic operator are executed by the PAU core 306. In an example, the instruction SRAM 308 can be partitioned to establish the sets of instructions. In this example, the specific programmable atomic operator being requested by a requesting process can identify the programmable atomic operator by the partition number. The partition number can be established when the programmable atomic operator is registered with (e.g., loaded onto) the programmable atomic unit 302. Other metadata for the programmable instructions can be stored in memory (e.g., in partition tables) in memory local to the programmable atomic unit 302.

In an example, atomic operators manipulate the data cache 310, which is generally synchronized (e.g., flushed) when a thread for an atomic operator completes. Thus, aside from initial loading from the external memory, such as from the memory controller 314, latency can be reduced for most memory operations during execution of a programmable atomic operator thread.

A pipelined processor, such as the PAU core 306, can experience an issue when an executing thread attempts to issue a memory request if an underlying hazard condition would prevent such a request. Here, the memory request is to retrieve data from the memory controller 314, whether it be from a cache on the memory controller 314 or off-die memory. To resolve this issue, the PAU core 306 is configured to deny the memory request for a thread. Generally, the PAU core 306 or the thread control 304 can include circuitry to enable one or more thread rescheduling points in the pipeline. Here, the denial occurs at a point in the pipeline that is beyond (e.g., after) these thread rescheduling points. In an example, the hazard occurred beyond the rescheduling point. Here, a preceding instruction in the thread created the hazard after the memory request instruction passed the last thread rescheduling point prior to the pipeline stage in which the memory request could be made.

In an example, to deny the memory request, the PAU core 306 is configured to determine (e.g., detect) that there is a hazard on memory indicated in the memory request. Here, hazard denotes any condition such that allowing (e.g., performing) the memory request will result in an inconsistent state for the thread. In an example, the hazard is an in-flight memory request. Here, whether or not the data cache 310 includes data for the requested memory address, the presence of the in-flight memory request makes it uncertain what the data in the data cache 310 at that address should be. Thus, the thread must wait for the in-flight memory request to be completed to operate on current data. The hazard is cleared when the memory request completes.

In an example, the hazard is a dirty cache line in the data cache 310 for the requested memory address. Although the dirty cache line generally indicates that the data in the cache is current and the memory controller version of this data is not, an issue can arise on thread instructions that do not operate from the cache. An example of such an instruction uses a built-in atomic operator, or other separate hardware block, of the memory controller 314. In the context of a memory controller, the built-in atomic operators can be separate from the programmable atomic unit 302 and do not have access to the data cache 310 or instruction SRAM 308 inside the PAU. If the cache line is dirty, then the built-in atomic operator will not be operating on the most current data until the data cache 310 is flushed to synchronize the cache and the other or off-die memories. This same situation could occur with other hardware blocks of the memory controller, such as cryptography block, encoder, etc.

Figure 4:
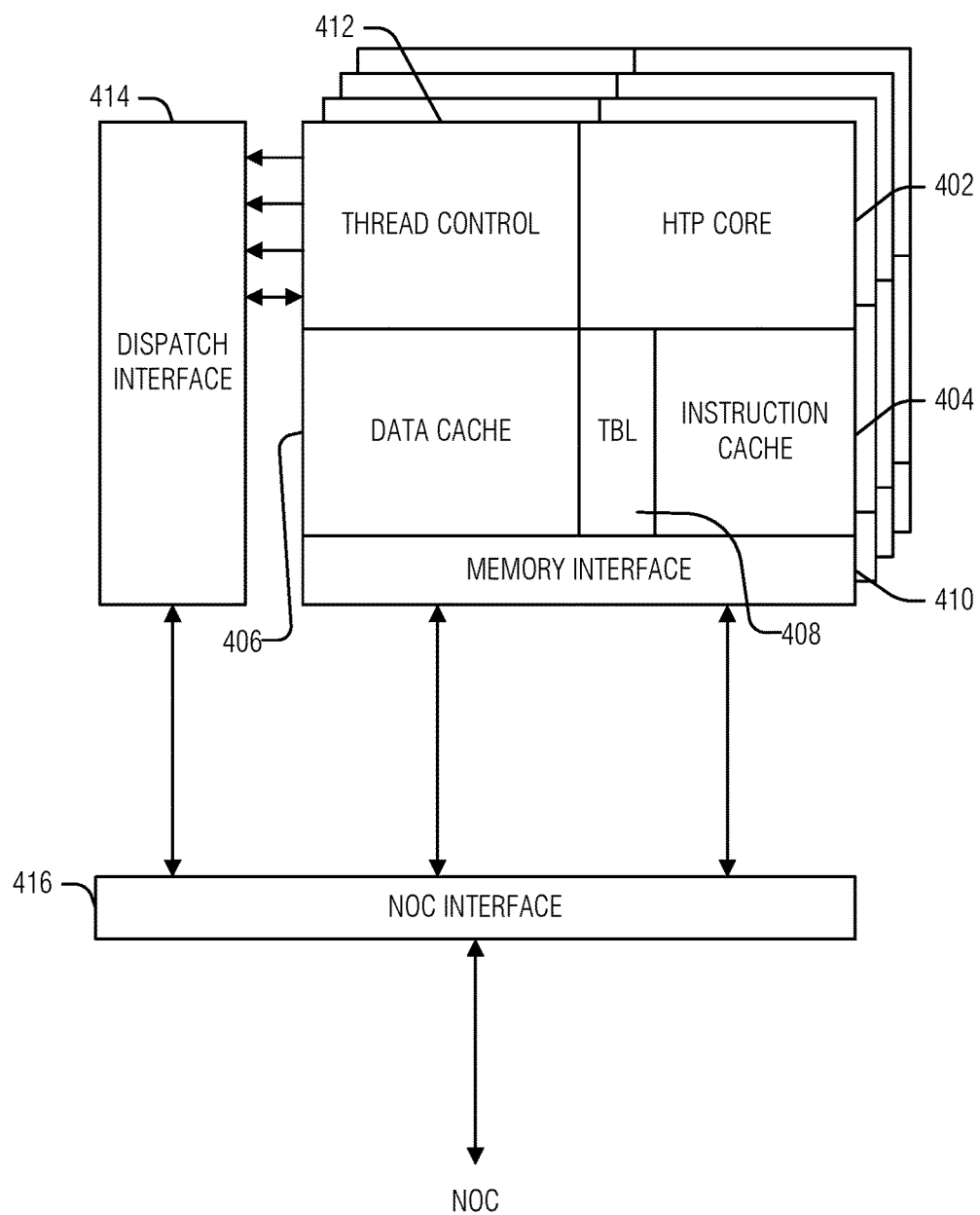
FIG. 4 illustrates an example of a hybrid threading processor (HTP) accelerator of a memory-compute device, according to an embodiment.

FIG. 4 illustrates an example of a hybrid threading processor (HTP) accelerator, or HTP accelerator 400. The HTP accelerator 400 can comprise a portion of a memory-compute device, according to an embodiment. In an example, the HTP accelerator 400 can include or comprise the HTP 140 from the example of FIG. 1. The HTP accelerator 400 includes, for example, a HTP core 402, an instruction cache 404, a data cache 406, a translation block 408, a memory interface 410, and a thread controller 412. The HTP accelerator 400 can further include a dispatch interface 414 and a NOC interface 416, such as for interfacing with a NOC such as the first NOC 118 from the example of FIG. 1, the second NOC 206 from the example of FIG. 2, or other NOC.

In an example, the HTP accelerator 400 includes a module that is based on a RISC-V instruction set, and can include a relatively small number of other or additional custom instructions to support a low-overhead, threading-capable Hybrid Threading (HT) language. The HTP accelerator 400 can include a highly-threaded processor core, the HTP core 402, in which, or with which, threads can be executed in a single instruction rotation, such as to maintain high instruction throughput. In an example, a thread can be paused when it waits for other, pending events to complete. This can allow the compute resources to be efficiently used on relevant work instead of polling. In an example, multiple-thread barrier synchronization can use efficient HTP-to-HTP and HTP-to/from-Host messaging, such as can allow thousands of threads to initialize or wake in, for example, tens of clock cycles.

In an example, the dispatch interface 414 can comprise a functional block of the HTP accelerator 400 for handling hardware-based thread management. That is, the dispatch interface 414 can manage dispatch of work to the HTP core 402 or other accelerators. Non-HTP accelerators, however, are generally not able to dispatch work. In an example, work dispatched from a host can use dispatch queues that reside in, e.g., host main memory (e.g., DRAM-based memory). Work dispatched from the HTP accelerator 400, on the other hand, can use dispatch queues that reside in SRAM, such as within the dispatches for the target HTP accelerator 400 within a particular node.

In an example, the HTP core 402 can comprise one or more cores that execute instructions on behalf of threads. That is, the HTP core 402 can include an instruction processing block. The HTP core 402 can further include, or can be coupled to, the thread controller 412. The thread controller 412 can provide thread control and state for each active thread within the HTP core 402. The data cache 406 can include cache for a host processor (e.g., for local and remote memory-compute devices, including for the HTP core 402), and the instruction cache 404 can include cache for use by the HTP core 402. In an example, the data cache 406 can be configured for read and write operations, and the instruction cache 404 can be configured for read only operations.

In an example, the data cache 406 is a small cache provided per hardware thread. The data cache 406 can temporarily store data for use by the owning thread. The data cache 406 can be managed by hardware or software in the HTP accelerator 400. For example, hardware can be configured to automatically allocate or evict lines as needed, as load and store operations are executed by the HTP core 402. Software, such as using RISC-V instructions, can determine which memory accesses should be cached, and when lines should be invalidated or written back to other memory locations.

Data caching on the HTP accelerator 400 has various benefits, including making larger accesses more efficient for the memory controller, allowing an executing thread to avoid stalling. However, there are situations when using the cache causes inefficiencies. An example includes accesses where data is accessed only once, and causes thrashing of the cache lines. To help address this problem, the HTP accelerator 400 can use a set of custom load instructions to force a load instruction to check for a cache hit, and on a cache miss to issue a memory request for the requested operand and not put the obtained data in the data cache 406. The HTP accelerator 400 thus includes various different types of load instructions, including non-cached and cache line loads. The non-cached load instructions use the cached data if dirty data is present in the cache. The non-cached load instructions ignore clean data in the cache, and do not write accessed data to the data cache. For cache line load instructions, the complete data cache line (e.g., comprising 64 bytes) can be loaded from memory into the data cache 406, and can load the addressed memory into a specified register. These loads can use the cached data if clean or dirty data is in the data cache 406. If the referenced memory location is not in the data cache 406, then the entire cache line can be accessed from memory. Use of the cache line load instructions can reduce cache misses when sequential memory locations are being referenced (such as memory copy operations) but can also waste memory and bandwidth at the NOC interface 416 if the referenced memory data is not used.

In an example, the HTP accelerator 400 includes a custom store instruction that is non-cached. The non-cached store instruction can help avoid thrashing the data cache 406 with write data that is not sequentially written to memory.

In an example, the HTP accelerator 400 further includes a translation block 408. The translation block 408 can include a virtual-to-physical translation block for local memory of a memory-compute device. For example, a host processor, such as in the HTP core 402, can execute a load or store instruction, and the instruction can generate a virtual address. The virtual address can be translated to a physical address of the host processor, such as using a translation table from the translation block 408. The memory interface 410, for example, can include an interface between the HTP core 402 and the NOC interface 416.

The HTP accelerator 400 can process several threads to complete a variety of computing tasks within a memory-compute device on a CNM node. Accordingly, implementing non-blocking external device calls on the HTP accelerator 400 can provide the increased thread processing throughput benefits described above. Namely, that the same hardware resources can execute more thread instructions for a given unit of time when threads indicate that a particular call is a no-return request, and the hardware supports such requests. In the context of several memory-compute devices, possibly spread across several nodes, such efficiencies can provide a significant positive impact on the overall system efficiency.

The HTP accelerator 400 can be configured to implement a non-blocking external device call. The non-blocking external device call enables a thread executing on the HTP accelerator 400 to designate a call to memory, for example, as non-blocking (e.g., no wait). Thus, the HTP core 402 or the thread controller 412 can be configured to reschedule a thread after the request is made without waiting for a response to the request. Generally, an external device call is a request for processing at the external device. Thus, when the call is made to the memory, generally, the call will be for an atomic operation as opposed to a read (e.g., in which a return is needed) or a write (e.g., in which data is generally not returned). External device calls can also include a call to another HTP accelerator to start a thread, a remote procedure request of another node, etc.

Specifically, the HTP core 402 is configured to receive an instruction from a thread that is directed to a device. This device has a latency such that the HTP accelerator will need to suspend the thread to await completion of the instruction under ordinary circumstances. Typically, such requests are external to the HTP accelerator 400, such as to memory, another HTP accelerator, an HTF, or other device accessed through the NOC interface 416. However, it can be possible that some unillustrated component of the HTP accelerator 400, external to the HTP core 402, can invoke such a latency situation. In any case the instruction, or call, by the thread would typically involve sleeping the thread (e.g., not rescheduling further instructions of the thread) until a response to the instruction is received. However, if the instruction has a no-return indication, then the HTP core 402 or the thread controller 412 enables the thread to continue executing once the instruction is executed (e.g., once the HTP core 402 passes off the request to the memory interface 410, the NOC interface 416, etc.). In an example, the indication is a state variable or other latch or trigger that is external to the instruction. In an example, the no-return indication is included in the instruction. This example involves a specific instruction (e.g., EXTERN_REQ.NO_RETURN vs. EXTERN_REQ), a field, flag, or other bits that signal that this is a no-return instruction. In an example, the no-return indication is a field of the instruction. In an example, the no-return indication is a single bit. In an example, the single bit is one of several in an operation code field of the instruction.

As noted above, the device to which the instruction is directed can be a memory controller, such as the memory controller 200. In an example, the instruction is an atomic operation. In an example, the atomic operation is a programmable atomic operation. Such instructions are all examples of those that involve latencies outside the typically latencies of thread instructions and would traditionally involve suspending the calling thread.

When the no-return indication is detected by the HTP accelerator 400, such as by the HTP core 402, a counter corresponding to the thread is increased based on the no-return indication. The counter can be part of the HTP core 402, the thread controller 412, the memory interface 410, or another component of the HTP accelerator. For the following examples, the counter part of the thread controller 412. As noted above, the counter is specific to the thread and is incremented one to maintain a count of outstanding no-return requests. Although the following examples start the counter at zero and increment by one as each no-return instruction is executed, decrementing by one as each return to the instruction is received, other numbering systems can be used. However, the counter is adjusted to account for outstanding instructions (e.g., those requests that have been made but not yet completed) will operate in the same manner.

Due to the presence of the no-return indication in the instruction, the thread controller 412 (or in some cases the HTP core 402) are configured to continue execution of the thread without waiting for a return from the device. Generally, enabling the thread to continue execution involves placing the thread back into a schedule for the HTP core 402. Thus, the thread does not block (e.g., suspend, sleep, etc.) waiting for the result of the request. In an example, continuing execution of the thread includes placing an identifier of the thread into a ready-to-run queue, or other thread instruction scheduling device, of the HTP core 402. Regardless of the implementation, the thread can continue executing as if the instruction to the device were the same as if the instruction had been to an abstract logic unit (ALU) of the HTP core 402.

The HTP core 402 is configured to decrement (e.g., decrease) the counter based on receipt of the return value to the instruction. The return can be an indication as to whether the instruction was executed successfully or not. The return value can also include data. Thus, for example, the return value can be the result of an atomic operation, such as read data from memory and add one. In an example, the return value indicates whether an atomic operation completed successfully without including a result of the atomic operation. In either case, the return value signals to the HTP accelerator 400 that the instruction is complete, and the counter is decremented.

In an example, the return value is received (e.g., by the processing circuitry) and discarded. Discarding the return value can reduce unnecessary operations by the HTP accelerator 400. For example, in a typical (e.g., absent the no-return indication) instruction sequence, the result will be placed in a register for use by the thread. However, as the thread has indicated that the return is not useful, storing the return value involves fruitless processing because the thread will not use the value. Generally, the earlier in the receipt pipeline that the return can be discarded, the better. Thus, discarding the return value can free communications resources (e.g., bandwidth on a bus or network) when unwanted data is not returned. In this case, only the data of the return value is omitted, not the result (e.g., exit code) of the request. This enables the counter to be decremented when the request is complete.

In an example, the counter is the sole counter used for every no-return instruction of the thread to a device outside of the processing circuitry. Thus, only one counter is maintained by the HTP accelerator 400 for each (current) thread. Accordingly, if the thread executes a memory request against a first memory controller and a programmable atomic operation against a second memory controller, the single counter is incremented twice. In an example, a separate counter can be maintained for each device. Thus, in the above example, two counters would each be incremented once. Generally, the number of counters per thread are fixed. Thus, in a per-device counter arrangement, if three devices are supported, then each thread will have three counters. However, in large CNM systems, it can be impossible to know beforehand how many devices a thread can make requests to, or it can be impractical to maintain a counter for each of these devices. To address this issue, a separate counter per device type (and thread) can also be used. Generally, the single counter is sufficient to ascertain whether the thread is in a consistent state to exit. The added complexity of the additional counters can, in some circumstances, provide greater flexibility to, for example, enable the thread to exit under certain circumstances even if there is an outstanding (e.g., uncompleted) request. For example, during a shutdown procedure, a thread can be prevented from exiting when there are outstanding requests to memory or storage, but the thread can exit if there are outstanding requests to a sensor system, because the sensor system doesn't maintain state and will lose state as part of the shutdown. Device types can be defined through a variety of classifications. For example, such classifications as storage, actuator, sensor, etc. can be used. Device types can also be more specific, such as volatile memory, non-volatile memory, etc.

Until the counter is brought back to its initial (e.g., empty) state (e.g., at zero), the HTP accelerator 400 (e.g., the HTP core 402 or the thread controller 412) prevents the thread from completing. For example, in some architectures, the thread can execute a last instruction (e.g., ETR) to indicate that it is complete. In this example, the last instruction will not be scheduled until the counter is back at zero. Other techniques can also be used, such as suspending the thread after its final instruction until the counter is back to its initial state. In any case, the thread is prevented from completing while there are outstanding return values to instructions issued by the thread. Once the counter reaches its initial state, the consistency of data or action by the thread is equivalent to a thread that never issued a non-blocking request and the thread can exit without any other entity having to account for the fact that the thread used a non-blocking request.

The following are examples of instructions that include a no-return indication in the context of the architecture described with respect to FIGS. 1-4. For example, a floating-point memory atomic instruction. Floating point atomic memory operations can be sent to a memory controller with built-in atomics. The floating-point operations performed can be MIN, MAX and ADD, for both 32 and 64-bit data types.

Below are examples of the instruction formats:

| 31 | 27 | 26 | 25 | 24 | 20 | 19 | 15 | 14 | 12 | 11 | 7 | 6 | 0 | |
|---|---|---|---|---|---|---|---|---|---|---|---|---|---|---|
| | 00000 | aq | rl | rs2 | | rs1 | | 010 | | rd | | 0101110 | | AMOFADD.S |
| | 00001 | aq | rl | rs2 | | rs1 | | 010 | | rd | | 0101110 | | AMOFMIN.S |
| | 00010 | aq | rl | rs2 | | rs1 | | 010 | | rd | | 0101110 | | AMOFMAZ.S |

| 31 | 27 | 26 | 25 | 24 | 20 | 19 | 15 | 14 | 12 | 11 | 7 | 6 | 0 | |
|---|---|---|---|---|---|---|---|---|---|---|---|---|---|---|
| | 00000 | aq | rl | rs2 | | rs1 | | 011 | | rd | | 0101110 | | AMOFADD.D |
| | 00001 | aq | rl | rs2 | | rs1 | | 011 | | rd | | 0101110 | | AMOFMIN.D |
| | 00010 | aq | rl | rs2 | | rs1 | | 011 | | rd | | 0101110 | | AMOFMAZ.D |

| 31 | 27 | 26 | 25 | 24 | 20 | 19 | 15 | 14 | 12 | 11 | 7 | 6 | 0 | |
|---|---|---|---|---|---|---|---|---|---|---|---|---|---|---|
| | 00000 | aq | rl | rs2 | | rs1 | | 010 | | 00000 | | 0101110 | | AMOFADD.S.NR |
| | 00001 | aq | rl | rs2 | | rs1 | | 010 | | 00000 | | 0101110 | | AMOFMIN.S.NR |
| | 00010 | aq | rl | rs2 | | rs1 | | 010 | | 00000 | | 0101110 | | AMOFMAZ.S.NR |

| 31 | 27 | 26 | 25 | 24 | 20 | 19 | 15 | 14 | 12 | 11 | 7 | 6 | 0 | |
|---|---|---|---|---|---|---|---|---|---|---|---|---|---|---|
| | 00000 | aq | rl | rs2 | | rs1 | | 010 | | 00000 | | 0101110 | | AMOFADD.D.NR |
| | 00001 | aq | rl | rs2 | | rs1 | | 010 | | 00000 | | 0101110 | | AMOFMIN.D.NR |
| | 00010 | aq | rl | rs2 | | rs1 | | 010 | | 00000 | | 0101110 | | AMOFMAZ.D.NR |

HTP floating-point atomic instructions can specify several parameters for an operation. The following table lists examples of the parameters:

| Floating-point atomic inputs | How input is specified | Description |
|---|---|---|
| Atomic Address | X Register rs1 | The atomic address is provided in A register rs1. The atomic address specifies the location in memory to perform the operation |
| Data | F Register rs2 | The data value used as input to the floating-point atomic operation. |
| No return | Instruction opcode bit 29 | The no return specifies that any returned value from the floating-point atomic operations is to be ignored, and that the issuing HTP thread can continue execution without waiting for the operation to complete. In an example, the atomic operation must acknowledge completion prior to the issuing HTP thread being able to complete a thread return (ETR). |
| Acquire/ Release | Instruction aq and rl fields | The atomic instructions can have aq and rl fields that specify whether previous thread write data is to be visible to other threads prior to issuing the atomic operation (rl), and whether previously read data by this thread should be invalidated after the atomic completes (aq). Specifically, the rl bit forces all dirty cache lines to be written back to memory, and the aq bit forces all clean read buffers to be invalidated. |

The result value is written to F register rd provide the nr instruction bit is not set.

The following are example assembly instructions for a thread, including both return and no-return indications:

| | | |
|---|---|---|
| AMOFADD.S | rd, rs2, (rs1) | # Versions of instructions that return a value |
| AMOFMIN.S | rd, rs2, (rs1) | |
| AMOFMAX.S | rd, rs2, (rs1) | |
| AMOFADD.D | rd, rs2, (rs1) | |
| AMOFMIN.D | rd, rs2, (rs1) | |
| AMOFMAX.D | rd, rs2, (rs1) | |
| AMOFADD.S.NR | rs2, (rs1) | # Versions of instructions that have no return (NR) |
| AMOFMIN.S.NR | rs2, (rs1) | # value and do not stall the HTP thread |
| AMOFMAX.S.NR | rs2, (rs1) | |
| AMOFADD.D.NR | rs2, (rs1) | |
| AMOFMIN.D.NR | rs2, (rs1) | |
| AMOFMAX.D.NR | rs2, (rs1) | |

In an example, the atomic instructions have the following possible traps:

| Trap | Description |
|---|---|
| Misaligned Atomic | An atomic was performed to an address that was not properly aligned for the access size. |
| Invalid Address | An atomic was performed to an invalid virtual address |

Another type of instruction is a Programmable Atomic Memory (PMA) instruction. Programmable atomic memory operations can be issued by the HTP accelerator 400 to a PAU located within a memory controller. Generally, as noted above, the PMA routines are loaded by an operating system when directed by an application. The PMA routines are loaded into the PAU instruction RAM. The PAU instruction RAM is partitioned into fixed sized segments. A PMA routine is loaded into one or more partitions dictated by the size of the routine. The operating system determines the partition(s) that a routine is loaded and initializes a mapping table within each HTP accelerator. The mapping table is referenced when the HTP accelerator 400 executes a PMA instruction to determine the partition on a PAU to begin executing the programmable atomic routine. Execution of an HTP PMA instruction that references an uninitialized programmable atomic mapping table entry causes a trap. The described mechanism virtualizes the PAU system wide resource.

The following figure illustrates an example of a PMA instruction format:

| 31 | 27 | 26 25 | 24 20 | 19 15 | 14 13 | 12 11 | 7 | 6 0 | |
|---|---|---|---|---|---|---|---|---|---|
| 00001 | | aq rl | rs2 | rs1 | nr | cc | 00000 | 0110010 | EAC rs1, rs2 |

In an example, the PMA instruction can include several parameters for a programmable atomic operation. The following table lists some of these parameters:

| Inputs | How Input is Specified | Description |
|---|---|---|
| Programmable Atomic Identifier | X Register specified by rs1 | Programmable atomic identifier that specifies the programmable atomic operation to be performed. Values 0-31 are valid. |
| Programmable Atomic Address | X Register A0 | The programmable atomic address is provided in X register A0. The memory address is used for two purposes: 1) To set a Programmable Atomic lock, ensuring other programmable atomic operations with the same address do not execute concurrently. |

-continued

| Inputs | How Input is Specified | Description |
|---|---|---|
| | | 2) To identify a contiguous block of memory that all PAU routine memory references can access. All PAU routine memory references are checked to ensure they are within the contiguous block of memory. |
| Call Argument Count Call Arguments | Instruction cc field (0, 1, 2, or4) X Registers A1-A4 | Up to four data values can be passed to the PAM routine as starting values. The call argument count is provided by the cc instruction field (specified in assembly by suffixes C0, C1, C2 or C4). The actual argument values are obtained from X registers a1-a4 and are provided as input to the programmable atomic routine as the same X registers. |
| No return | Instruction nr field | The nr field specifies that any returned value from the programmable atomic operation is to be ignored, and that the issuing HTP thread can continue execution without waiting for the programmable operation to complete. In an example, the programmable atomic must acknowledge completion prior to the issuing HTP thread can complete a thread return (ETR). |
| Acquire/Release | Instruction aq and rl fields | The EAC instruction has aq and rl fields that specify whether previous thread write data is to be visible to other threads prior to issuing the atomic operation (rl), and whether previously read data by this thread should be invalidated after the atomic completes (aq). Specifically, the rl bit forces all dirty cache lines to be written back to memory, and the aq bit forces all clean read buffers to be invalidated. |

In an example, the number of result values returned from the PAM routine can be in the range of 0-2. The number of returned values can be specified by the PAM routine's initialization instruction. In an example, the result values are written to registers a0-a1 when the nr instruction bit is not set.

Example Assembly to Execute a PAM Instruction:

| | |
|---|---|
| EAC.C0 rs1 | # Zero call arguments, wait for a result, relaxed consistency |
| EAC.C4.NR.AQRL rs1 | # Four call arguments, do not wait, strong consistency |

The cc field is used to specify the number of arguments (0, 1, 2, or 4). The following table shows the encodings.

Programmable Atomic Instruction Call Argument Count Suffix:

| cc Field Encoding | Suffix | Call Argument Count |
|---|---|---|
| 0 | .C0 | 0 |
| 1 | .C1 | 1 |
| 2 | .C2 | 2 |
| 3 | .C4 | 4 |

Programmable Atomic Instruction No Return Suffix:

| nr Field Encoding | Suffix | Description |
|---|---|---|
| 0 | No Suffix | Result, stall HTP thread |
| 1 | .NR | No result, do not stall HTP thread |

Programmable atomic instructions can have the following traps:

| Trap | Description |
|---|---|
| Invalid Address | A programmable atomic was performed to an invalid virtual address |

In these examples, the decoded flag that indicates a memory access instruction's response value is not needed is saved and used when the response is received by the HTP accelerator 400 to prohibit the response value from being written to a general-purpose register. Again, a count of the number of outstanding no-return memory responses is maintained and used to prohibit the thread from completing to ensure that a parent thread will properly see the correct results in memory.

Figure 5:
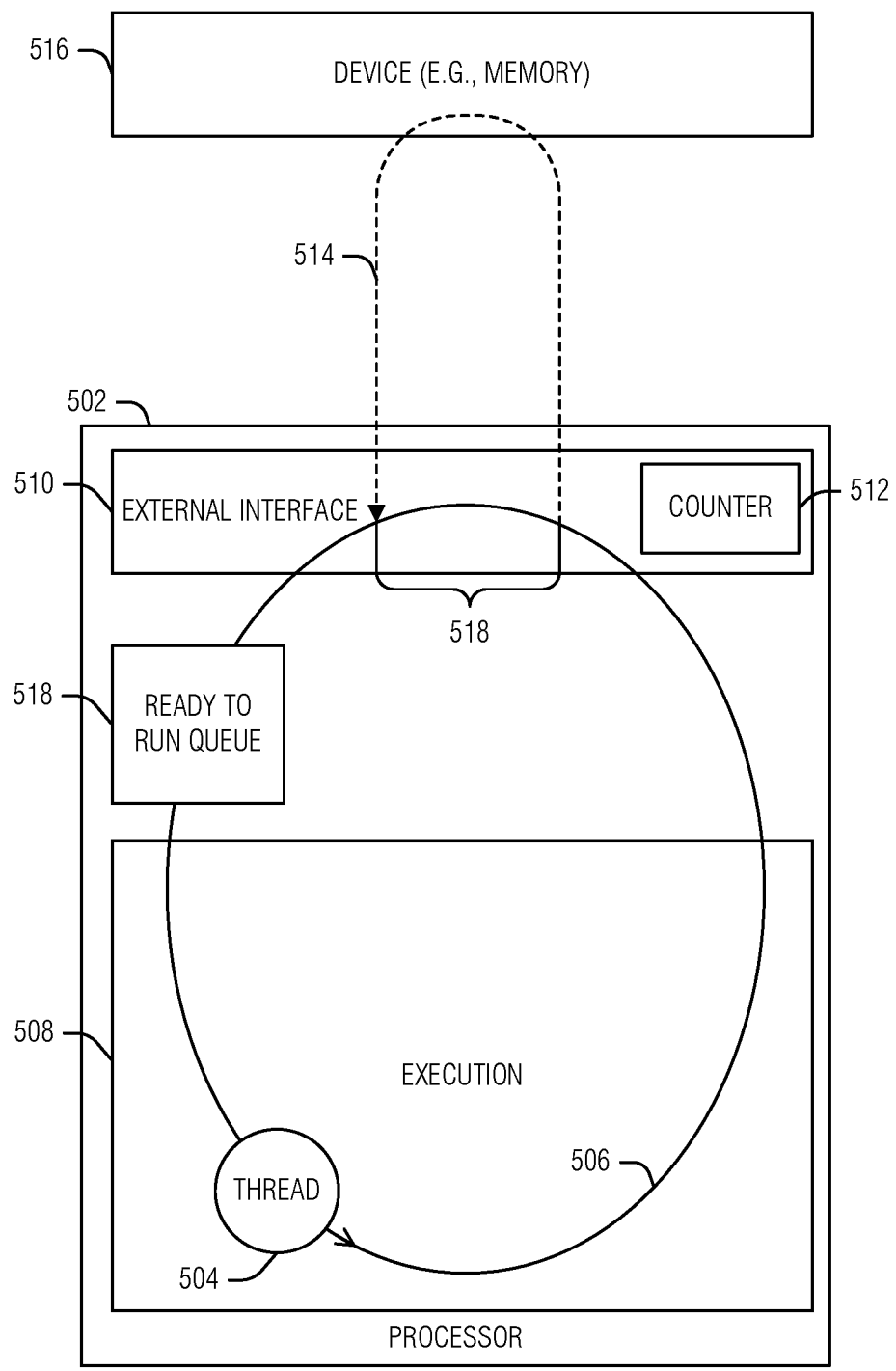
FIG. 5 illustrates an example of a thread execution in a processor with a non-blocking call to an external device, according to an embodiment.
Figure 6:
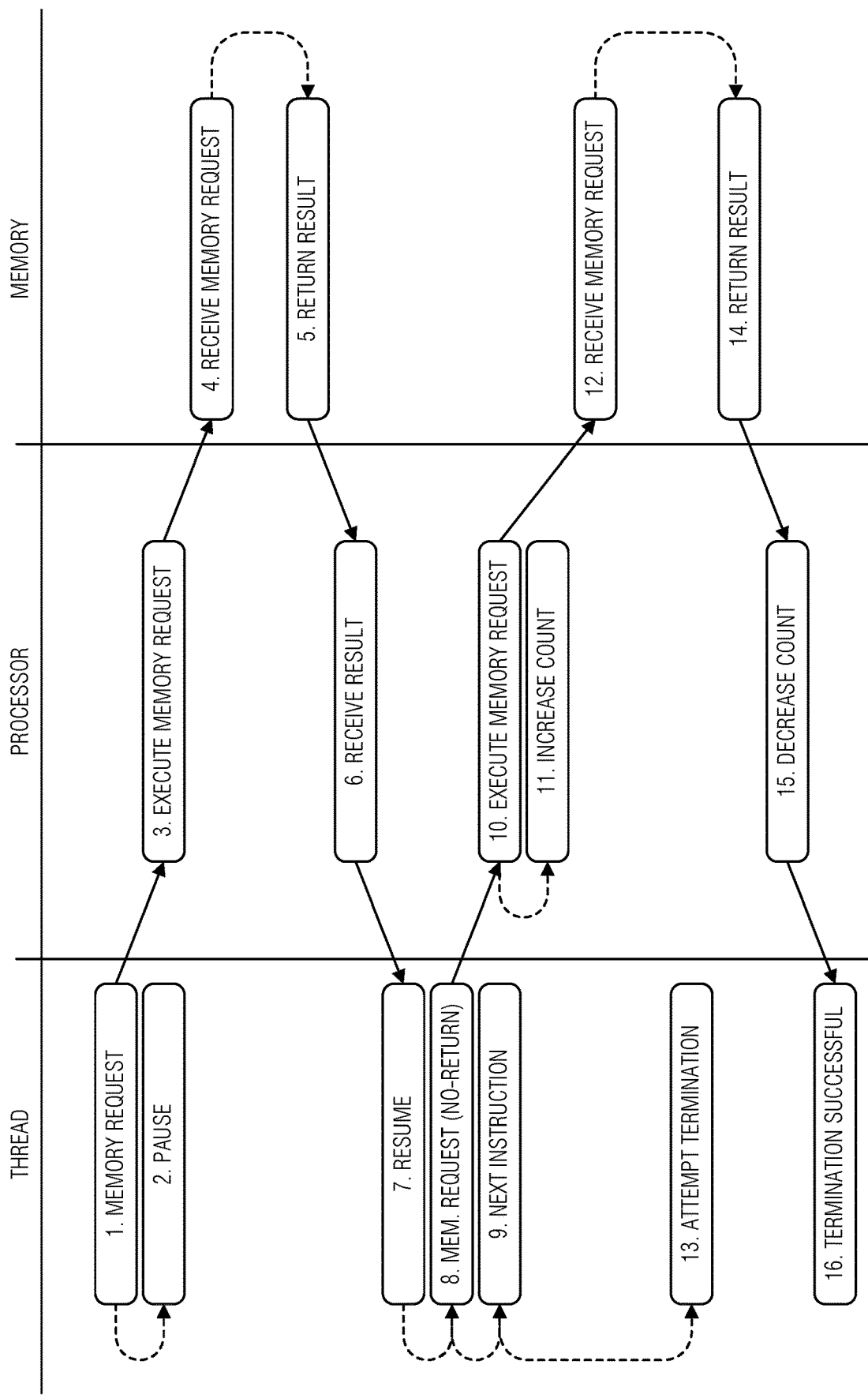
FIG. 6 illustrates an example of contrasting operations sequences for a blocking and a non-blocking call to an external device, according to an embodiment.

These non-blocking external device techniques provide an elegant mechanism by which to reduce unnecessary thread stalling in a variety of architectures while maintaining data consistency between threads. FIGS. 5 and 6 illustrate some additional example details on non-blocking external device calls.

FIG. 5 illustrates an example of a thread execution in a processor with a non-blocking call to an external device, according to an embodiment. FIG. 5 reduces the components from those described above with respect to the HTP accelerator 400, to illustrate that the non-blocking call technique can be applied to a variety of processor architectures. Here, the processor 502 includes an execution facility 508—such as one or more ALUs, Execution Units (EUs), registers, pointers, counters, accumulators, processing pipeline components, etc.—and an external interface 510 to one or more devices (e.g., memory, memory controllers, sensors, etc.). The processor is illustrated with a ready-to-run queue 518 to schedule threads, although other thread scheduling facilities can be used.

When implementing the non-blocking call to the device 516, and the thread 504 is executing on the processor 502, the thread 504 follows the conceptual path 506 through the execution facility 508 to make (e.g., execute, request, etc.) a non-blocking call to the device 516. The call (e.g., instruction) enters the external interface 510 where, for example, the instruction is converted in a communication (e.g., a CPI packet, bus transmission, etc.) to reach the device 516. In response to the communication, the device 516 provides a return value (e.g., whether or not the call was successful, data, etc.) to form an exchange 514. The time period 518 represents the time to complete the exchange 514.

When the call is a non-blocking (e.g., no-return) call, the processor 502 immediately places the thread 504 into the ready-to-run queue 518 upon execution of the call. In contrast, in traditional schemes or if the thread 504 does not indicate that the call is non-blocking, then the processor 502 will suspend the thread 504 for the time period 518 to complete the exchange 514 with the device 516.

In order to maintain data consistency between the thread 504 and other actors of the processor 502, the processor 502 maintains the counter 512 to track how many exchanges 514 are started but not yet complete for the thread 504. Thus, when a non-blocking call is made by the thread 504, the processor 502 increments the counter 512. When the return value is received to complete the exchange 514, the processor 502 decrements the counter 512. If the counter 512 is initialized to zero, incremented by one for each call by the thread 504 that traverses the external interface 510, and decremented by one for each return value received at the external interface 510, the processor 502 prevents the thread from completing (e.g., exiting) when the counter is above zero.

Although non-blocking calls are not always appropriate—such as when the thread 504 will apply a future instruction to data retrieved from the device 516—enabling non-blocking calls reduces thread execution latency by the time period 518 for each of these calls. In environments with many threads, such savings can be significant.

FIG. 6 illustrates an example of contrasting operations sequences for a blocking and a non-blocking call to an external device, according to an embodiment. Starting at a thread makes a standard (e.g., blocking or returning) request to memory (1.) and then pauses (2.). The processor executes the memory request (3.). The memory receives the request (4.) and returns a result (5.) from completing the request. As noted above, this result generally includes the status of the request (e.g., completely successfully, failed, error code, etc.) and can also include data (e.g., the bits at a memory address specified in the request). Once the processor receives the result (6.) the thread is resumed (7.) and proceeds with additional instructions.

As illustrated, the next instruction for the thread is a no-return memory request (8.), such as execution of an atomic operation at the memory. As with the standard request, the no-return request is executed by the processor (10.). However, the thread immediately continues to the next instruction (9.) and the processor increases the outstanding no-return request counter (11.).

Again, the memory receives the request (12.) and returns the result (14.). In an example, the request indicates that it is a no-return request to the memory. In this example, the memory can omit data in the result that may otherwise be included. This can eliminate needless transferring of data that will not be used by the thread.

As illustrated, before the memory returns the result (14.), the thread attempts to terminate (13.). The processor prevents the successful termination because the count indicates an outstanding request. However, once the processor receives the result, the processor decrements the count (15.) to zero and enables the thread to successfully terminate (16.).

Figure 7:
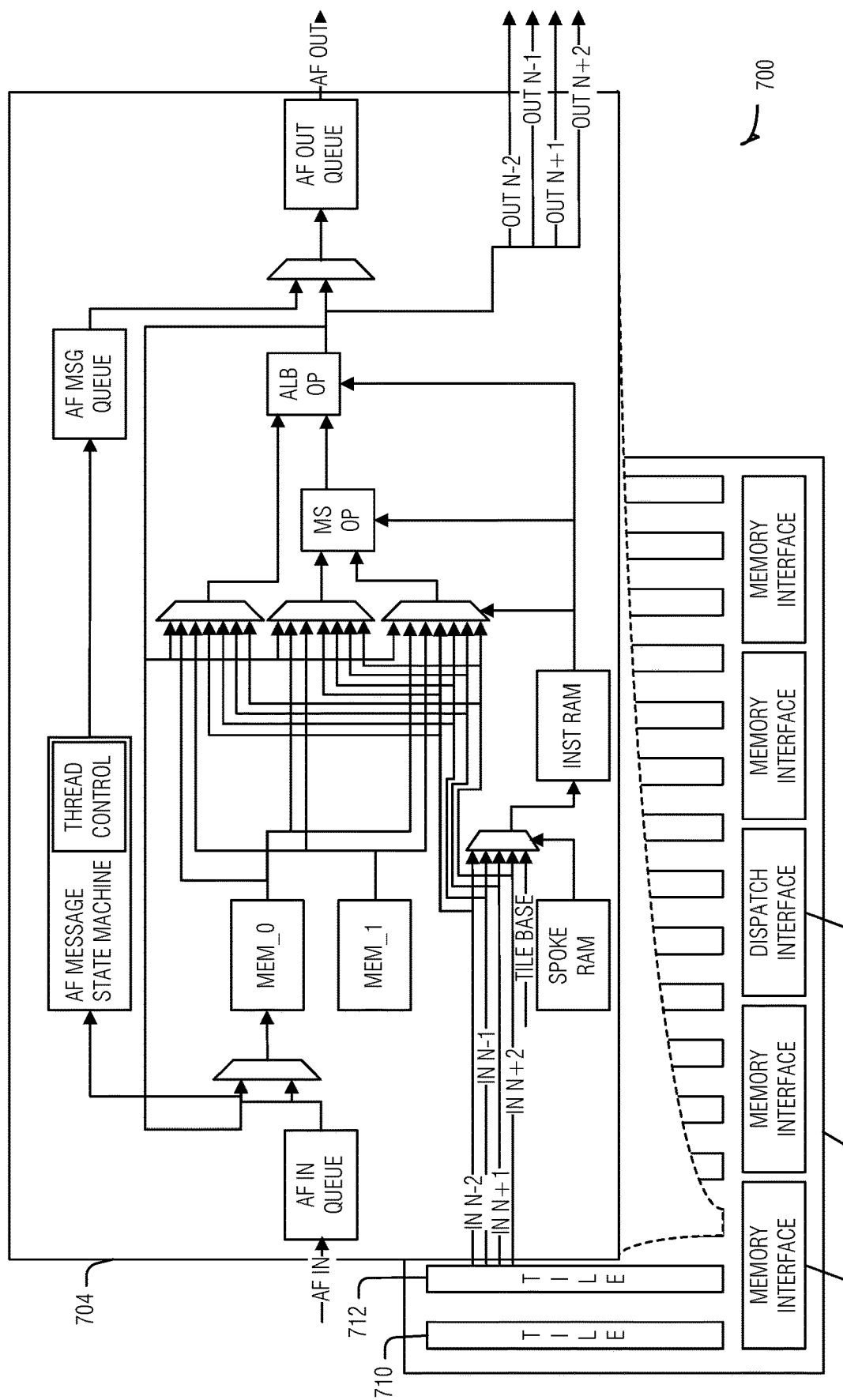
FIG. 7 illustrates an example of a representation of a hybrid threading fabric (HTF) of a memory-compute device, according to an embodiment.

FIG. 7 illustrates an example of a representation of a hybrid threading fabric (HTF), or HTF 700, of a memory-compute device, according to an embodiment. In an example, the HTF 700 can include or comprise the HTF 142 from the example of FIG. 1. The HTF 700 is a coarse-grained, reconfigurable compute fabric that can be optimized for high-level language operand types and operators (e.g., using C/C++ or other high-level language). In an example, the HTF 700 can include configurable, n-bit wide (e.g., 512-bit wide) data paths that interconnect hardened SIMD arithmetic units.

In an example, the HTF 700 comprises an HTF cluster 702 that includes multiple HTF tiles, including an example tile 704, or Tile N. Each HTF tile can include one or more compute elements with local memory and arithmetic functions. For example, each tile can include a compute pipeline with support for integer and floating-point operations. In an example, the data path, compute elements, and other infrastructure can be implemented as hardened IP to provide maximum performance while minimizing power consumption and reconfiguration time.

In the example of FIG. 7, the tiles comprising the HTF cluster 702 are linearly arranged, and each tile in the cluster can be coupled to one or multiple other tiles in the HTF cluster 702. In the example of FIG. 7, the example tile 704, or Tile N, is coupled to four other tiles, including to a base tile 710 (e.g., Tile N−2) via the port labeled SF IN N−2, to an adjacent tile 712 (e.g., Tile N−1) via the port labeled SF IN N−1, and to a Tile N+1 via the port labeled SF IN N+1 and to a Tile N+2 via the port labeled SF IN N+2. The example tile 704 can be coupled to the same or other tiles via respective output ports, such as those labeled SF OUT N−1, SF OUT N−2, SF OUT N+1, and SF OUT N+2. In this example, the ordered list of names for the various tiles are notional indications of the positions of the tiles. In other examples, the tiles comprising the HTF cluster 702 can be arranged in a grid or other configuration, with each tile similarly coupled to one or several of its nearest neighbors in the grid. Tiles that are provided at an edge of a cluster can optionally have fewer connections to neighboring tiles. For example, Tile N−2, or the base tile 710 in the example of FIG. 7, can be coupled only to the adjacent tile 712 (Tile N−1) and to the example tile 704 (Tile N). Fewer or additional inter-tile connections can similarly be used.

The HTF cluster 702 can further include memory interface modules, including a first memory interface module 706. The memory interface modules can couple the HTF cluster 702 to a NOC, such as the first NOC 118. In an example, the memory interface modules can allow tiles within a cluster to make requests to other locations in a memory-compute system, such as in the same or different node in the system. That is, the representation of the HTF 700 can comprise a portion of a larger fabric that can be distributed across multiple nodes, such as with one or more HTF tiles or HTF clusters at each of the nodes. Requests can be made between tiles or nodes within the context of the larger fabric.

In the example of FIG. 7, the tiles in the HTF cluster 702 are coupled using a synchronous fabric (SF). The synchronous fabric can provide communication between a particular tile and its neighboring tiles in the HTF cluster 702, as described above. Each HTF cluster 702 can further include an asynchronous fabric (AF) that can provide communication among, e.g., the tiles in the cluster, the memory interfaces in the cluster, and a dispatch interface 708 in the cluster.

In an example, the synchronous fabric can exchange messages that include data and control information. The control information can include, among other things, instruction RAM address information or a thread identifier. The control information can be used to set up a data path, and a data message field can be selected as a source for the path. Generally, the control fields can be provided or received earlier, such that they can be used to configure the data path. For example, to help minimize any delay through the synchronous domain pipeline in a tile, the control information can arrive at a tile a few clock cycles before the data field. Various registers can be provided to help coordinate dataflow timing in the pipeline.

In an example, each tile in the HTF cluster 702 can include multiple memories. Each memory can have the same width as the data path (e.g., 512 bits) and can have a specified depth, such as in a range of 512 to 1024 elements. The tile memories can be used to store data that supports data path operations. The stored data can include constants loaded as part of a kernel's cluster configuration, for example, or can include variables calculated as part of the data flow. In an example, the tile memories can be written from the asynchronous fabric as a data transfer from another synchronous domain, or can include a result of a load operation such as initiated by another synchronous domain. The tile memory can be read via synchronous data path instruction execution in the synchronous domain.

In an example, each tile in an HTF cluster 702 can have a dedicated instruction RAM (INST RAM). In an example of an HTF cluster 702 with sixteen tiles, and instruction RAM instances with sixty-four entries, the cluster can allow algorithms to be mapped with up to 1024 multiply-shift and/or ALU operations. The various tiles can optionally be pipelined together, such as using the synchronous fabric, to allow data flow compute with minimal memory access, thus minimizing latency and reducing power consumption. In an example, the asynchronous fabric can allow memory references to proceed in parallel with computation, thereby providing more efficient streaming kernels. In an example, the various tiles can include built-in support for loop-based constructs and can support nested looping kernels.

The synchronous fabric can allow multiple tiles to be pipelined, such as without a need for data queuing. Tiles that participate in a synchronous domain can, for example, act as a single pipelined data path. A first or base tile (e.g., Tile N−2, in the example of FIG. 7) of a synchronous domain can initiate a thread of work through the pipelined tiles. The base tile can be responsible for starting work on a predefined cadence referred to herein as a Spoke Count. For example, if the Spoke Count is 3, then the base tile can initiate work every third clock cycle.

In an example, the synchronous domain comprises a set of connected tiles in the HTF cluster 702. Execution of a thread can begin at the domain's base tile and can progress from the base tile, via the synchronous fabric, to other tiles in the same domain. The base tile can provide the instruction to be executed for the first tile. The first tile can, by default, provide the same instruction for the other connected tiles to execute. However, in some examples, the base tile, or a subsequent tile, can conditionally specify or use an alternative instruction. The alternative instruction can be chosen by having the tile's data path produce a Boolean conditional value, and then can use the Boolean value to choose between an instruction set of the current tile and the alternate instruction.

The asynchronous fabric can be used to perform operations that occur asynchronously relative to a synchronous domain. Each tile in the HTF cluster 702 can include an interface to the asynchronous fabric. The inbound interface can include, for example, a FIFO buffer or queue (e.g., AF IN QUEUE) to provide storage for message that cannot be immediately processed. Similarly, the outbound interface of the asynchronous fabric can include a FIFO buffer or queue (e.g., AF OUT QUEUE) to provide storage for messages that cannot be immediately sent out.

In an example, messages in the asynchronous fabric can be classified as data messages or control messages. Data messages can include a SIMD width data value that is written to either tile memory 0 (MEM_0) or memory 1 (MEM_1). Control messages can be configured to control thread creation, to free resources, or to issue external memory references.

A tile in the HTF cluster 702 can perform various compute operations for the HTF. The compute operations can be performed by configuring the data path within the tile. In an example, a tile includes two functional blocks that perform the compute operations for the tile: a Multiply and Shift Operation block (MS OP) and an Arithmetic, Logical, and Bit Operation block (ALB OP). The two blocks can be configured to perform pipelined operations such as a Multiply and Add, or a Shift and Add, among others.

In an example, each instance of a memory-compute device in a system can have a complete supported instruction set for its operator blocks (e.g., MS OP and ALB OP). In this case, binary compatibility can be realized across all devices in the system. However, in some examples, it can be helpful to maintain a base set of functionality and optional instruction set classes, such as to meet various design tradeoffs, such as die size. The approach can be similar to how the RISC-V instruction set has a base set and multiple optional instruction subsets.

In an example, the example tile 704 can include a Spoke RAM. The Spoke RAM can be used to specify which input (e.g., from among the four SF tile inputs and the base tile input) is the primary input for each clock cycle. The Spoke RAM read address input can originate at a counter that counts from zero to Spoke Count minus one. In an example, different spoke counts can be used on different tiles, such as within the same HTF cluster 702, to allow a number of slices, or unique tile instances, used by an inner loop to determine the performance of a particular application or instruction set. In an example, the Spoke RAM can specify when a synchronous input is to be written to a tile memory, for instance when multiple inputs for a particular tile instruction are used and one of the inputs arrives before the others. The early-arriving input can be written to the tile memory and can be later read when all of the inputs are available. In this example, the tile memory can be accessed as a FIFO memory, and FIFO read and write pointers can be stored in a register-based memory region or structure in the tile memory.

FIG. 8A and FIG. 8B illustrate generally an example of a chiplet system that can be used to implement one or more aspects of the CNM system 102. As similarly mentioned above, a node in the CNM system 102, or a device within a node in the CNM system 102, can include a chiplet-based architecture or compute-near-memory (CNM) chiplet. A packaged memory-compute device can include, for example, one, two, or four CNM chiplets. The chiplets can be interconnected using high-bandwidth, low-latency interconnects such as using a CPI interface. Generally, a chiplet system is made up of discrete modules (each a "chiplet") that are integrated on an interposer and, in many examples, are interconnected as desired through one or more established networks to provide a system with the desired functionality. The interposer and included chiplets can be packaged together to facilitate interconnection with other components of a larger system. Each chiplet can include one or more individual integrated circuits (ICs), or "chips," potentially in combination with discrete circuit components, and can be coupled to a respective substrate to facilitate attachment to the interposer. Most or all chiplets in a system can be individually configured for communication through established networks.

The configuration of chiplets as individual modules of a system is distinct from such a system being implemented on single chips that contain distinct device blocks (e.g., intellectual property (IP) blocks) on one substrate (e.g., single die), such as a system-on-a-chip (SoC), or multiple discrete packaged devices integrated on a printed circuit board (PCB). In general, chiplets provide better performance (e.g., lower power consumption, reduced latency, etc.) than discrete packaged devices, and chiplets provide greater production benefits than single die chips. These production benefits can include higher yields or reduced development costs and time.

Chiplet systems can include, for example, one or more application (or processor) chiplets and one or more support chiplets. Here, the distinction between application and support chiplets is simply a reference to the likely design scenarios for the chiplet system. Thus, for example, a synthetic vision chiplet system can include, by way of example only, an application chiplet to produce the synthetic vision output along with support chiplets, such as a memory controller chiplet, a sensor interface chiplet, or a communication chiplet. In a typical use case, the synthetic vision designer can design the application chiplet and source the support chiplets from other parties. Thus, the design expenditure (e.g., in terms of time or complexity) is reduced because by avoiding the design and production of functionality embodied in the support chiplets.

Chiplets also support the tight integration of IP blocks that can otherwise be difficult, such as those manufactured using different processing technologies or using different feature sizes (or utilizing different contact technologies or spacings). Thus, multiple ICs or IC assemblies, with different physical, electrical, or communication characteristics can be assembled in a modular manner to provide an assembly with various desired functionalities. Chiplet systems can also facilitate adaptation to suit needs of different larger systems into which the chiplet system will be incorporated. In an example, ICs or other assemblies can be optimized for the power, speed, or heat generation for a specific function—as can happen with sensors—can be integrated with other devices more easily than attempting to do so on a single die. Additionally, by reducing the overall size of the die, the yield for chiplets tends to be higher than that of more complex, single die devices.

FIG. 8A and FIG. 8B illustrate generally an example of a chiplet system, according to an embodiment. FIG. 8A is a representation of the chiplet system 802 mounted on a peripheral board 804, that can be connected to a broader computer system by a peripheral component interconnect express (PCIe), for example. The chiplet system 802 includes a package substrate 806, an interposer 808, and four chiplets, an application chiplet 810, a host interface chiplet 812, a memory controller chiplet 814, and a memory device chiplet 816. Other systems can include many additional chiplets to provide additional functionalities as will be apparent from the following discussion. The package of the chiplet system 802 is illustrated with a lid or cover 818, though other packaging techniques and structures for the chiplet system can be used. FIG. 8B is a block diagram labeling the components in the chiplet system for clarity.

The application chiplet 810 is illustrated as including a chiplet system NOC 820 to support a chiplet network 822 for inter-chiplet communications. In example embodiments the chiplet system NOC 820 can be included on the application chiplet 810. In an example, the first NOC 118 from the example of FIG. 1 can be defined in response to selected support chiplets (e.g., host interface chiplet 812, memory controller chiplet 814, and memory device chiplet 816) thus enabling a designer to select an appropriate number or chiplet network connections or switches for the chiplet system NOC 820. In an example, the chiplet system NOC 820 can be located on a separate chiplet, or within the interposer 808. In examples as discussed herein, the chiplet system NOC 820 implements a chiplet protocol interface (CPI) network.

In an example, the chiplet system 802 can include or comprise a portion of the first memory-compute node 104 or the first memory-compute device 112. That is, the various blocks or components of the first memory-compute device 112 can include chiplets that can be mounted on the peripheral board 804, the package substrate 806, and the interposer 808. The interface components of the first memory-compute device 112 can comprise, generally, the host interface chiplet 812, the memory and memory control-related components of the first memory-compute device 112 can comprise, generally, the memory controller chiplet 814, the various accelerator and processor components of the first memory-compute device 112 can comprise, generally, the application chiplet 810 or instances thereof, and so on.

The CPI interface, such as can be used for communication between or among chiplets in a system, is a packet-based network that supports virtual channels to enable a flexible and high-speed interaction between chiplets. CPI enables bridging from intra-chiplet networks to the chiplet network 822. For example, the Advanced eXtensible Interface (AXI) is a widely used specification to design intra-chip communications. AXI specifications, however, cover a great variety of physical design options, such as the number of physical channels, signal timing, power, etc. Within a single chip, these options are generally selected to meet design goals, such as power consumption, speed, etc. However, to achieve the flexibility of the chiplet system, an adapter, such as CPI, is used to interface between the various AXI design options that can be implemented in the various chiplets. By enabling a physical channel to virtual channel mapping and encapsulating time-based signaling with a packetized protocol, CPI bridges intra-chiplet networks across the chiplet network 822.

CPI can use a variety of different physical layers to transmit packets. The physical layer can include simple conductive connections, or can include drivers to increase the voltage, or otherwise facilitate transmitting the signals over longer distances. An example of one such a physical layer can include the Advanced Interface Bus (AIB), which in various examples, can be implemented in the interposer 808. AIB transmits and receives data using source synchronous data transfers with a forwarded clock. Packets are transferred across the AIB at single data rate (SDR) or dual data rate (DDR) with respect to the transmitted clock.

Various channel widths are supported by AIB. The channel can be configured to have a symmetrical number of transmit (TX) and receive (RX) input/outputs (I/Os), or have a non-symmetrical number of transmitters and receivers (e.g., either all transmitters or all receivers). The channel can act as an AIB principal or subordinate depending on which chiplet provides the principal clock. AIB I/O cells support three clocking modes: asynchronous (i.e. non-clocked), SDR, and DDR. In various examples, the non-clocked mode is used for clocks and some control signals. The SDR mode can use dedicated SDR only I/O cells, or dual use SDR/DDR I/O cells.

In an example, CPI packet protocols (e.g., point-to-point or routable) can use symmetrical receive and transmit I/O cells within an AIB channel. The CPI streaming protocol allows more flexible use of the AIB I/O cells. In an example, an AIB channel for streaming mode can configure the I/O cells as all TX, all RX, or half TX and half RX. CPI packet protocols can use an AIB channel in either SDR or DDR operation modes. In an example, the AIB channel is configured in increments of 80 I/O cells (i.e. 40 TX and 40 RX) for SDR mode and 40 I/O cells for DDR mode. The CPI streaming protocol can use an AIB channel in either SDR or DDR operation modes. Here, in an example, the AIB channel is in increments of 40 I/O cells for both SDR and DDR modes. In an example, each AIB channel is assigned a unique interface identifier. The identifier is used during CPI reset and initialization to determine paired AIB channels across adjacent chiplets. In an example, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

AIB defines a stacked set of AIB channels as an AIB channel column. An AIB channel column has some number of AIB channels, plus an auxiliary channel. The auxiliary channel contains signals used for AIB initialization. All AIB channels (other than the auxiliary channel) within a column are of the same configuration (e.g., all TX, all RX, or half TX and half RX, as well as having the same number of data I/O signals). In an example, AIB channels are numbered in continuous increasing order starting with the AIB channel adjacent to the AUX channel. The AIB channel adjacent to the AUX is defined to be AIB channel zero.

Generally, CPI interfaces on individual chiplets can include serialization-deserialization (SERDES) hardware. SERDES interconnects work well for scenarios in which high-speed signaling with low signal count are desirable. SERDES, however, can result in additional power consumption and longer latencies for multiplexing and demultiplexing, error detection or correction (e.g., using block level cyclic redundancy checking (CRC)), link-level retry, or forward error correction. However, when low latency or energy consumption is a primary concern for ultra-short reach, chiplet-to-chiplet interconnects, a parallel interface with clock rates that allow data transfer with minimal latency can be utilized. CPI includes elements to minimize both latency and energy consumption in these ultra-short reach chiplet interconnects.

For flow control, CPI employs a credit-based technique. A recipient, such as the application chiplet 810, provides a sender, such as the memory controller chiplet 814, with credits that represent available buffers. In an example, a CPI recipient includes a buffer for each virtual channel for a given time-unit of transmission. Thus, if the CPI recipient supports five messages in time and a single virtual channel, the recipient has five buffers arranged in five rows (e.g., one row for each unit time). If four virtual channels are supported, then the recipient has twenty buffers arranged in five rows. Each buffer holds the payload of one CPI packet.

When the sender transmits to the recipient, the sender decrements the available credits based on the transmission. Once all credits for the recipient are consumed, the sender stops sending packets to the recipient. This ensures that the recipient always has an available buffer to store the transmission.

As the recipient processes received packets and frees buffers, the recipient communicates the available buffer space back to the sender. This credit return can then be used by the sender allow transmitting of additional information.

The example of FIG. 8A includes a chiplet mesh network 824 that uses a direct, chiplet-to-chiplet technique without a need for the chiplet system NOC 820. The chiplet mesh network 824 can be implemented in CPI, or another chiplet-to-chiplet protocol. The chiplet mesh network 824 generally enables a pipeline of chiplets where one chiplet serves as the interface to the pipeline while other chiplets in the pipeline interface only with themselves.

Additionally, dedicated device interfaces, such as one or more industry standard memory interfaces (such as, for example, synchronous memory interfaces, such as DDR5, DDR6), can be used to connect a device to a chiplet. Connection of a chiplet system or individual chiplets to external devices (such as a larger system) can be through a desired interface (for example, a PCIe interface). Such an external interface can be implemented, in an example, through the host interface chiplet 812, which in the depicted example, provides a PCIe interface external to chiplet system. Such dedicated chiplet interfaces 826 are generally employed when a convention or standard in the industry has converged on such an interface. The illustrated example of a Double Data Rate (DDR) interface connecting the memory controller chiplet 814 to a dynamic random access memory (DRAM) memory device chiplet 816 is just such an industry convention.

Of the variety of possible support chiplets, the memory controller chiplet 814 is likely present in the chiplet system due to the near omnipresent use of storage for computer processing as well as sophisticated state-of-the-art for memory devices. Thus, using memory device chiplets 816 and memory controller chiplets 814 produced by others gives chiplet system designers access to robust products by sophisticated producers. Generally, the memory controller chiplet 814 provides a memory device-specific interface to read, write, or erase data. Often, the memory controller chiplet 814 can provide additional features, such as error detection, error correction, maintenance operations, or atomic operator execution. For some types of memory, maintenance operations tend to be specific to the memory device chiplet 816, such as garbage collection in NAND flash or storage class memories, temperature adjustments (e.g., cross temperature management) in NAND flash memories. In an example, the maintenance operations can include logical-to-physical (L2P) mapping or management to provide a level of indirection between the physical and logical representation of data. In other types of memory, for example DRAM, some memory operations, such as refresh can be controlled by a host processor or of a memory controller at some times, and at other times controlled by the DRAM memory device, or by logic associated with one or more DRAM devices, such as an interface chip (in an example, a buffer).

Atomic operators are a data manipulation that, for example, can be performed by the memory controller chiplet 814. In other chiplet systems, the atomic operators can be performed by other chiplets. For example, an atomic operator of "increment" can be specified in a command by the application chiplet 810, the command including a memory address and possibly an increment value. Upon receiving the command, the memory controller chiplet 814 retrieves a number from the specified memory address, increments the number by the amount specified in the command, and stores the result. Upon a successful completion, the memory controller chiplet 814 provides an indication of the command success to the application chiplet 810. Atomic operators avoid transmitting the data across the chiplet mesh network 824, resulting in lower latency execution of such commands.

Atomic operators can be classified as built-in atomics or programmable (e.g., custom) atomics. Built-in atomics are a finite set of operations that are immutably implemented in hardware. Programmable atomics are small programs that can execute on a programmable atomic unit (PAU) (e.g., a custom atomic unit (CAU)) of the memory controller chiplet 814.

The memory device chiplet 816 can be, or include any combination of, volatile memory devices or non-volatile memories. Examples of volatile memory devices include, but are not limited to, random access memory (RAM)—such as DRAM) synchronous DRAM (SDRAM), graphics double data rate type 6 SDRAM (GDDR6 SDRAM), among others. Examples of non-volatile memory devices include, but are not limited to, negative-and-(NAND)-type flash memory, storage class memory (e.g., phase-change memory or memristor based technologies), ferroelectric RAM (FeRAM), among others. The illustrated example includes the memory device chiplet 816 as a chiplet, however, the device can reside elsewhere, such as in a different package on the peripheral board 804. For many applications, multiple memory device chiplets can be provided. In an example, these memory device chiplets can each implement one or multiple storage technologies, and may include integrated compute hosts. In an example, a memory chiplet can include, multiple stacked memory die of different technologies, for example one or more static random access memory (SRAM) devices stacked or otherwise in communication with one or more dynamic random access memory (DRAM) devices. In an example, the memory controller chiplet 814 can serve to coordinate operations between multiple memory chiplets in the chiplet system 802, for example, to use one or more memory chiplets in one or more levels of cache storage, and to use one or more additional memory chiplets as main memory. The chiplet system 802 can include multiple memory controller chiplet 814 instances, as can be used to provide memory control functionality for separate hosts, processors, sensors, networks, etc. A chiplet architecture, such as in the illustrated system, offers advantages in allowing adaptation to different memory storage technologies; and different memory interfaces, through updated chiplet configurations, such as without requiring redesign of the remainder of the system structure.

Figure 9:
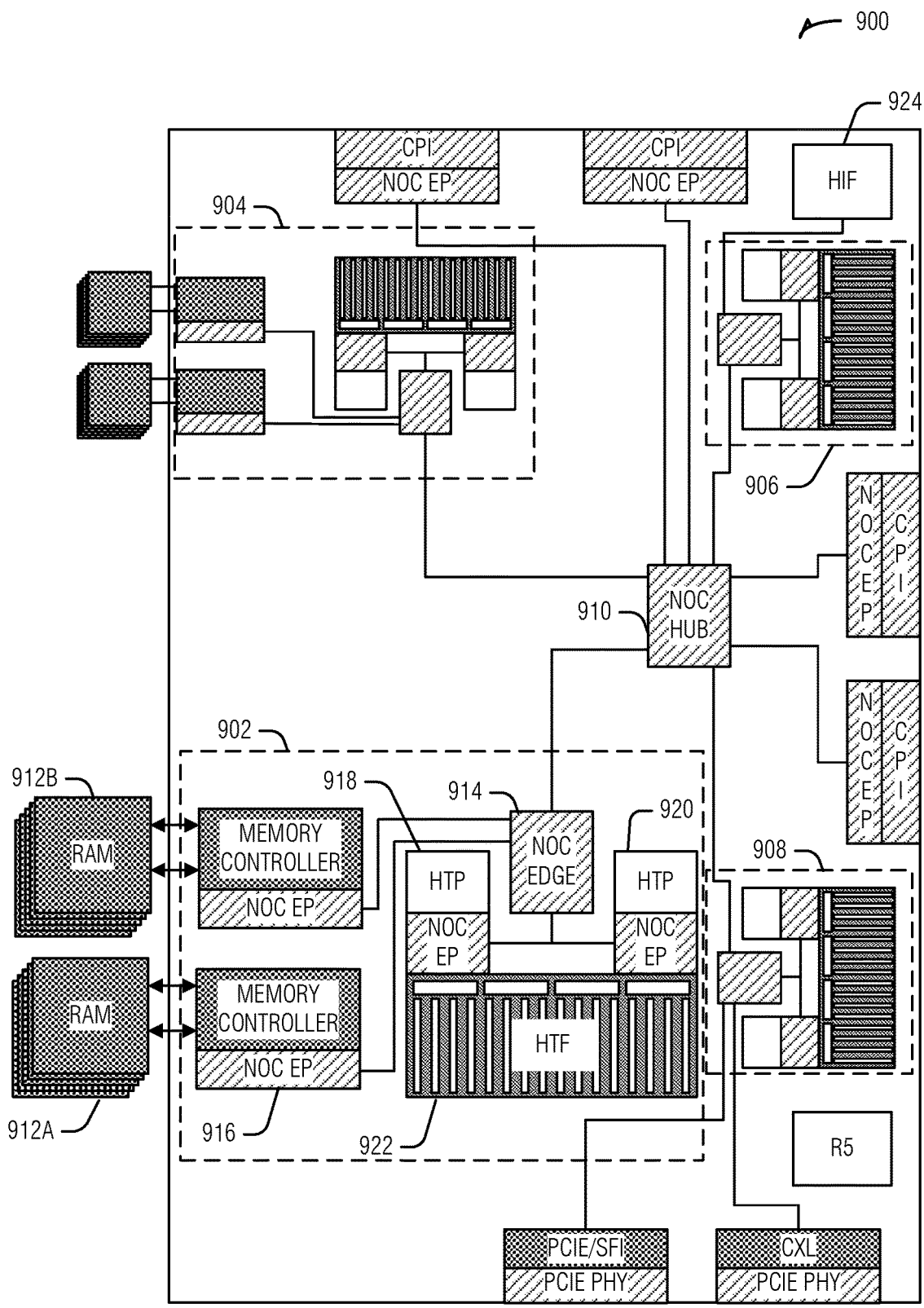
FIG. 9 illustrates generally an example of a chiplet-based implementation for a memory-compute device, according to an embodiment.

FIG. 9 illustrates generally an example of a chiplet-based implementation for a memory-compute device, according to an embodiment. The example includes an implementation with four compute-near-memory, or CNM, chiplets, and each of the CNM chiplets can include or comprise portions of the first memory-compute device 112 or the first memory-compute node 104 from the example of FIG. 1. The various portions can themselves include or comprise respective chiplets. The chiplet-based implementation can include or use CPI-based intra-system communications, as similarly discussed above in the example chiplet system 802 from FIG. 8A and FIG. 8B.

The example of FIG. 9 includes a first CNM package 900 comprising multiple chiplets. The first CNM package 900 includes a first chiplet 902, a second chiplet 904, a third chiplet 906, and a fourth chiplet 908 coupled to a CNM NOC hub 910. Each of the first through fourth chiplets can comprise instances of the same, or substantially the same, components or modules. For example, the chiplets can each include respective instances of an HTP accelerator, an HTF accelerator, and memory controllers for accessing internal or external memories.

In the example of FIG. 9, the first chiplet 902 includes a first NOC hub edge 914 coupled to the CNM NOC hub 910. The other chiplets in the first CNM package 900 similarly include NOC hub edges or endpoints. The switches in the NOC hub edges facilitate intra-chiplet, or intra-chiplet-system, communications via the CNM NOC hub 910.

The first chiplet 902 can further include one or multiple memory controllers 916. The memory controllers 916 can correspond to respective different NOC endpoint switches interfaced with the first NOC hub edge 914. In an example, the memory controller 916 comprises the memory controller chiplet 814 or comprises the memory controller 130, or comprises the memory subsystem 200, or other memory-compute implementation. The memory controllers 916 can be coupled to respective different memory devices, for example including a first external memory module 912a or a second external memory module 912b. The external memory modules can include, e.g., GDDR6 memories that can be selectively accessed by the respective different chiplets in the system.

The first chiplet 902 can further include a first HTP chiplet 918 and second HTP chiplet 920, such as coupled to the first NOC hub edge 914 via respective different NOC endpoint switches. The HTP chiplets can correspond to HTP accelerators, such as the HTP 140 from the example of FIG. 1, or the HTP accelerator 400 from the example of FIG. 4. The HTP chiplets can communicate with the HTF chiplet 922. The HTF chiplet 922 can correspond to an HTF accelerator, such as the HTF 142 from the example of FIG. 1, or the HTF 700 from the example of FIG. 7.

The CNM NOC hub 910 can be coupled to NOC hub instances in other chiplets or other CNM packages by way of various interfaces and switches. For example, the CNM NOC hub 910 can be coupled to a CPI interface by way of multiple different NOC endpoints on the first CNM package 900. Each of the multiple different NOC endpoints can be coupled, for example, to a different node outside of the first CNM package 900. In an example, the CNM NOC hub 910 can be coupled to other peripherals, nodes, or devices using CTCPI or other, non-CPI protocols. For example, the first CNM package 900 can include a PCIe scale fabric interface (PCIE/SFI) or a CXL interface (CXL) configured to interface the first CNM package 900 with other devices. In an example, devices to which the first CNM package 900 is coupled using the various CPI, PCIe, CXL, or other fabric, can make up a common global address space.

In the example of FIG. 9, the first CNM package 900 includes a host interface 924 (HIF) and a host processor (R5). The host interface 924 can correspond to, for example, the HIF 120 from the example of FIG. 1. The host processor, or R5, can correspond to the internal host processor 122 from the example of FIG. 1. The host interface 924 can include a PCI interface for coupling the first CNM package 900 to other external devices or systems. In an example, work can be initiated on the first CNM package 900, or a tile cluster within the first CNM package 900, by the host interface 924. For example, the host interface 924 can be configured to command individual HTF tile clusters, such as among the various chiplets in the first CNM package 900, into and out of power/clock gate modes.

Figure 10:
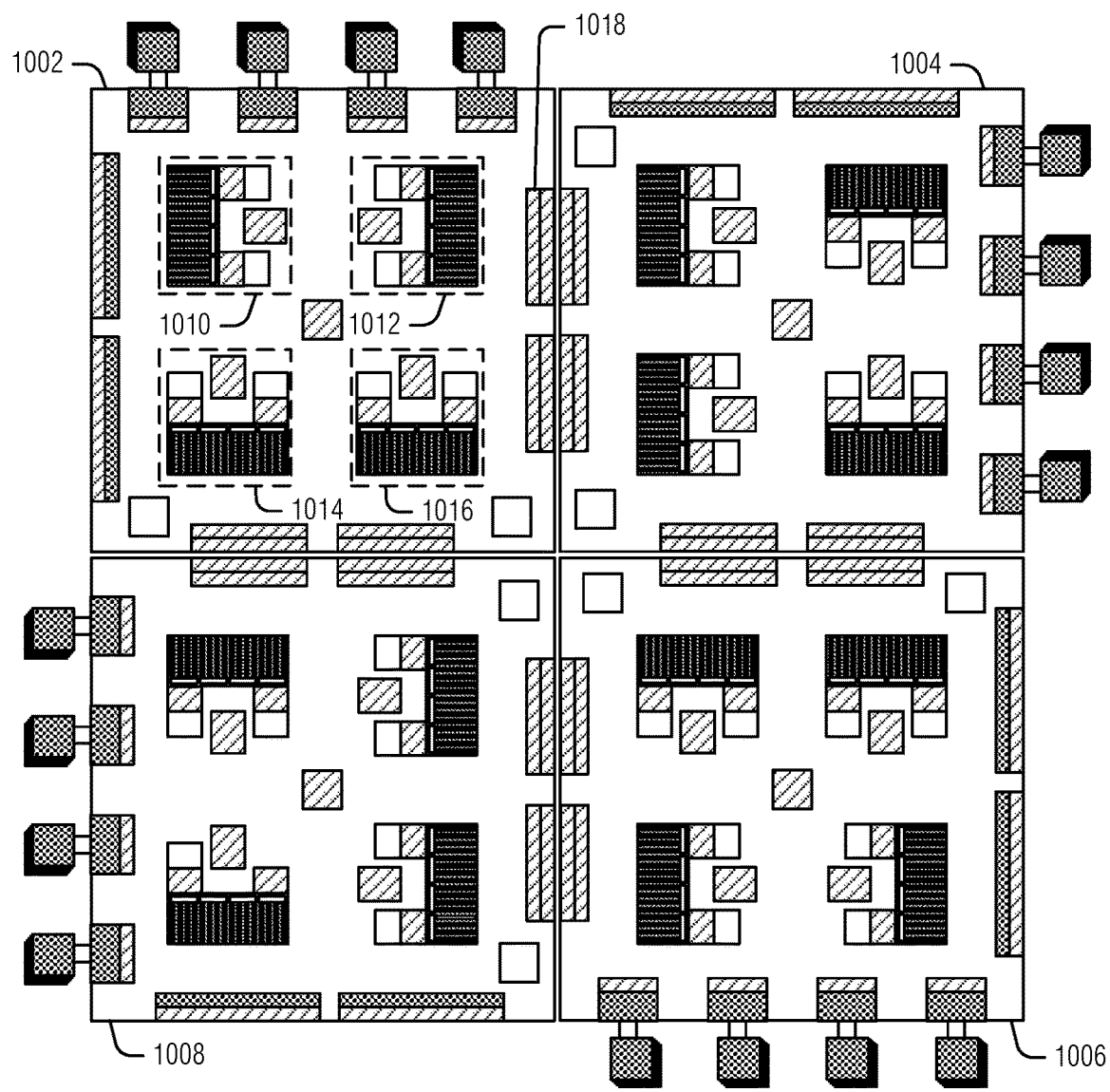
FIG. 10 illustrates an example tiling of memory-compute device chiplets, according to an embodiment.

FIG. 10 illustrates an example tiling of memory-compute devices, according to an embodiment. In FIG. 10, a tiled chiplet example 1000 includes four instances of different compute-near-memory clusters of chiplets, where the clusters are coupled together. Each instance of a compute-near-memory chiplet can itself include one or more constituent chiplets (e.g., host processor chiplets, memory device chiplets, interface chiplets, and so on).

The tiled chiplet example 1000 includes, as one or multiple of its compute-near-memory (CNM) clusters, instances of the first CNM package 900 from the example of FIG. 9. For example, the tiled chiplet example 1000 can include a first CNM cluster 1002 that includes a first chiplet 1010 (e.g., corresponding to the first chiplet 902), a second chiplet 1012 (e.g., corresponding to the second chiplet 904), a third chiplet 1014 (e.g., corresponding to the third chiplet 906), and a fourth chiplet 1016 (e.g., corresponding to the fourth chiplet 908). The chiplets in the first CNM cluster 1002 can be coupled to a common NOC hub, which in turn can be coupled to a NOC hub in an adjacent cluster or clusters (e.g., in a second CNM cluster 1004 or a fourth CNM cluster 1008).

In the example of FIG. 10, the tiled chiplet example 1000 includes the first CNM cluster 1002, the second CNM cluster 1004, a third CNM cluster 1006, and the fourth CNM cluster 1008. The various different CNM chiplets can be configured in a common address space such that the chiplets can allocate and share resources across the different tiles. In an example, the chiplets in the cluster can communicate with each other. For example, the first CNM cluster 1002 can be communicatively coupled to the second CNM cluster 1004 via an inter-chiplet CPI interface 1018, and the first CNM cluster 1002 can be communicatively coupled to the fourth CNM cluster 1008 via another or the same CPI interface. The second CNM cluster 1004 can be communicatively coupled to the third CNM cluster 1006 via the same or other CPI interface, and so on.

In an example, one of the compute-near-memory chiplets in the tiled chiplet example 1000 can include a host interface (e.g., corresponding to the host interface 924 from the example of FIG. 9) that is responsible for workload balancing across the tiled chiplet example 1000. The host interface can facilitate access to host-based command request queues and response queues, such as from outside of the tiled chiplet example 1000. The host interface can dispatch new threads of execution using hybrid threading processors and the hybrid threading fabric in one or more of the compute-near-memory chiplets in the tiled chiplet example 1000.

Figure 11:
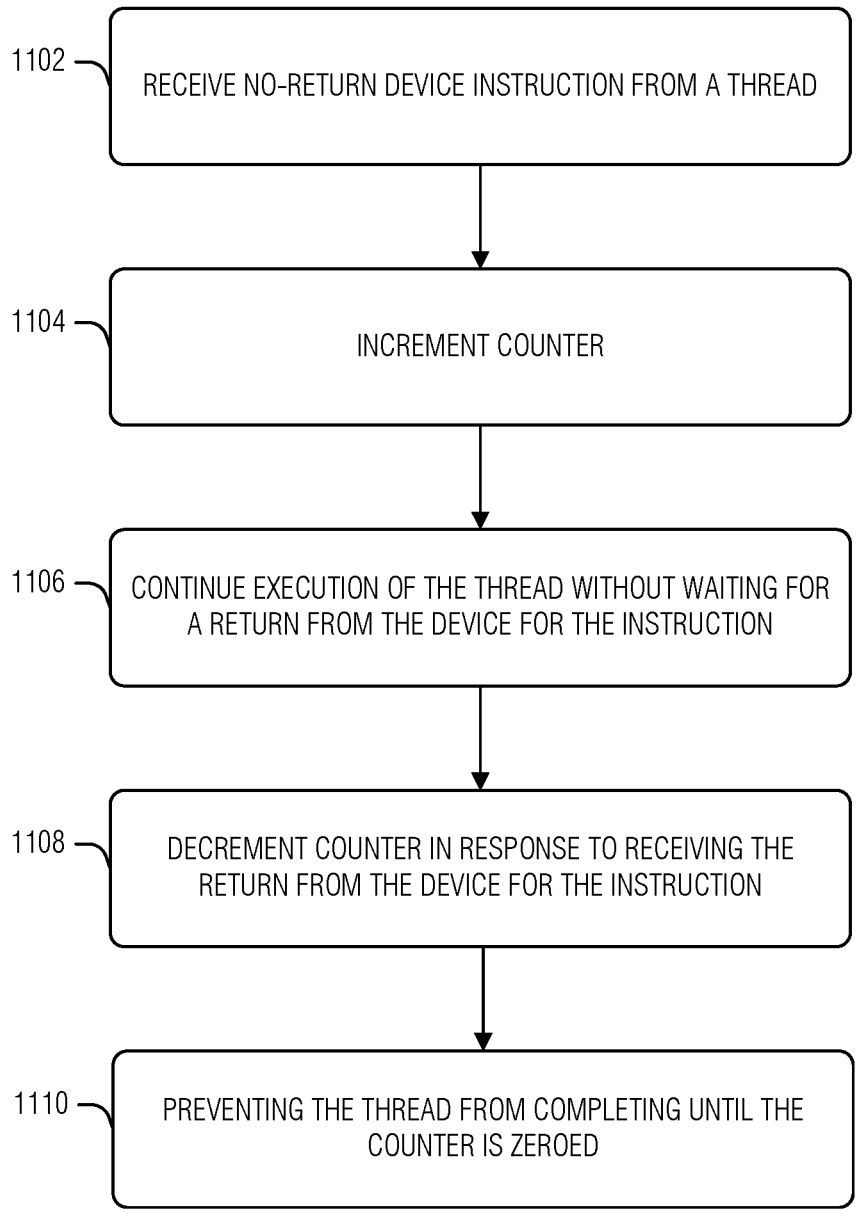
FIG. 11 is a flow chart of an example of a method for a non-blocking external device call, according to an embodiment.

FIG. 11 is a flow chart of an example of a method 1100 for non-blocking external device call, according to an embodiment. Operations of the method 1100 are performed by computer hardware, such as that described with respect to FIGS. 1-7, 8A-10 and 12, such as the memory-compute device 112, the memory controller 200, the PAU 208 or PAU 302, the HTP 400, or the HTF 700, or components therein in various combinations. Computer hardware performing the operations of the method 1100 includes processing circuitry configured (e.g., hardwired, by software including firmware, or a combination of the two) to implement the operations. In an example, the processing circuitry is part of a processor (e.g., the HTP 400 or the PAU 302) that includes an external interface (e.g., to a memory), an execution pipeline, and thread management circuitry, such as a thread-ready-to-run queue.

At operation 1102, an instruction is received by the processing circuitry from a thread; the instruction is directed to a device—such as external memory or other hardware accessed through an external interface. Here, the instruction corresponds to a no-return indication. In an example, the no-return indication is included in the instruction. In an example, the no-return indication is a field of the instruction. In an example, the no-return indication is a single bit. In an example, the single bit is one of several in an operation code field of the instruction.

In an example, the device is a memory controller. In an example, the instruction is an atomic operation. In an example, the atomic operation is a programmable atomic operation.

At operation 1104, a counter corresponding to the thread is increased based on the no-return indication. For example, as the processing circuitry handles the instruction, a counter maintained for the thread is incremented by one to maintain a count of outstanding no-return requests.

At operation 1106, execution of the thread is continued without waiting for a return value from the device. In an example, the return value is a result of an atomic operation. Thus, the thread does not block (e.g., suspend, sleep, etc.) waiting for the result of the request. In an example, continuing execution of the thread includes placing an identifier of the thread into an execution stack of the processing circuitry (e.g., a thread-ready-to-run queue or other thread instruction scheduling device).

At operation 1108, the counter is decremented (e.g., decreased) based on receipt of the return value to the request. In an example, the counter is a sole counter used for every no-return instruction of the thread to a device outside of the processing circuitry. In an example, the return value is received (e.g., by the processing circuitry) and discarded. In an example, the return value indicates whether an atomic operation completed successfully without including a result of the atomic operation.

At operation 1110, the thread is prevented from completing until the counter is zero. In an example, preventing the thread from completing includes removing a thread return instruction from execution when the counter is greater than zero.

Figure 12:
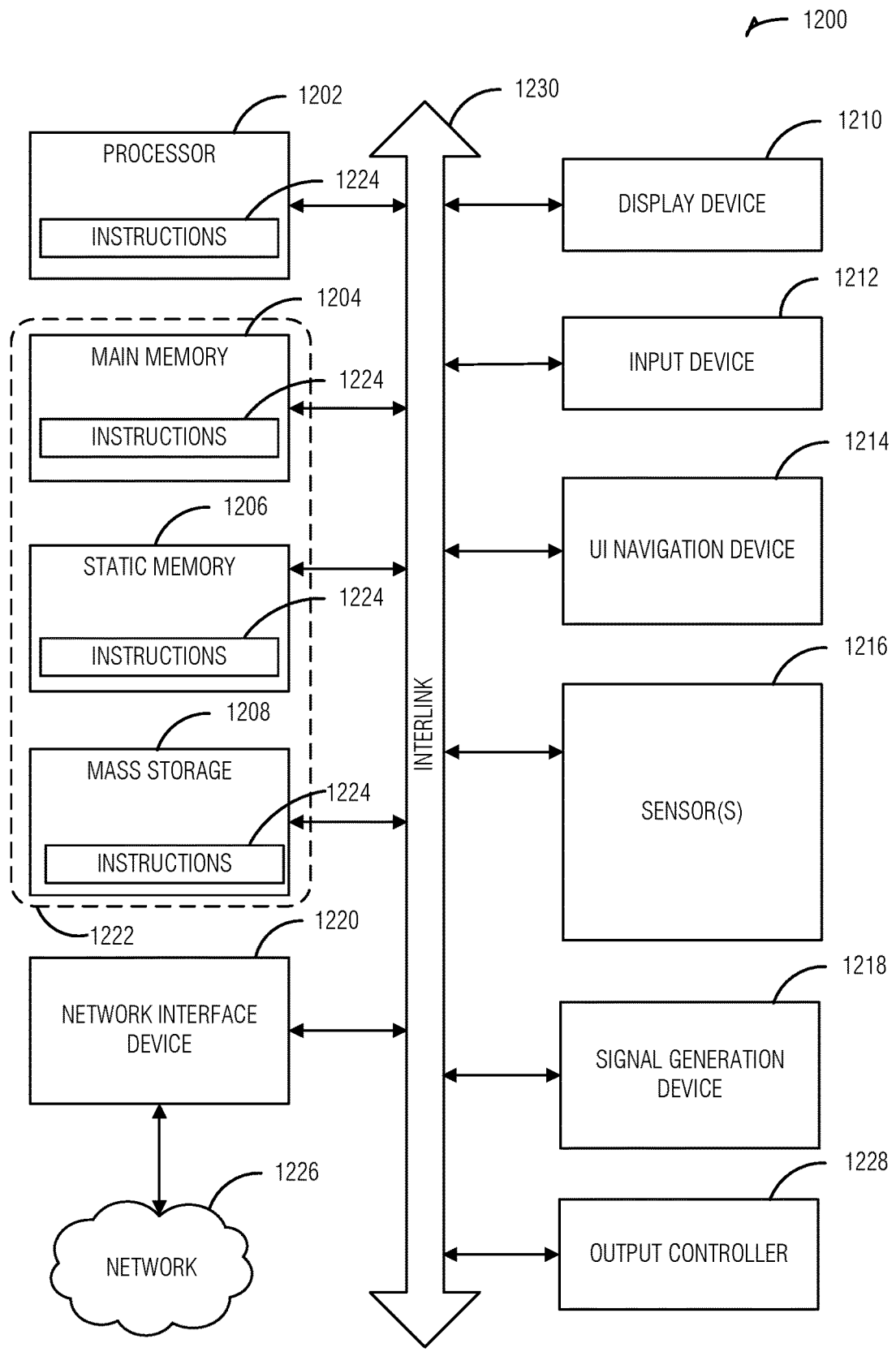
FIG. 12 illustrates a block diagram of an example machine with which, in which, or by which any one or more of the techniques (e.g., methodologies) discussed herein can be implemented.

FIG. 12 illustrates a block diagram of an example machine 1200 with which, in which, or by which any one or more of the techniques (e.g., methodologies) discussed herein can be implemented. Examples, as described herein, can include, or can operate by, logic or a number of components, or mechanisms in the machine 1200. Circuitry (e.g., processing circuitry) is a collection of circuits implemented in tangible entities of the machine 1200 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 1200.

In alternative embodiments, the machine 1200 can operate as a standalone device or can be connected (e.g., networked) to other machines. In a networked deployment, the machine 1200 can operate in the capacity of a server machine, a client machine, or both in server-client network environments. In an example, the machine 1200 can act as a peer machine in peer-to-peer (P2P) (or other distributed) network environment. The machine 1200 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine 1200 (e.g., computer system) can include a hardware processor 1202 (e.g., a central processing unit (CPU), a graphics processing unit (GPU), a hardware processor core, or any combination thereof), a main memory 1204, a static memory 1206 (e.g., memory or storage for firmware, microcode, a basic-input-output (BIOS), unified extensible firmware interface (UEFI), etc.), and mass storage device 1208 (e.g., hard drives, tape drives, flash storage, or other block devices) some or all of which can communicate with each other via an interlink 1230 (e.g., bus). The machine 1200 can further include a display device 1210, an alphanumeric input device 1212 (e.g., a keyboard), and a user interface (UI) Navigation device 1214 (e.g., a mouse). In an example, the display device 1210, the input device 1212, and the UI navigation device 1214 can be a touch screen display. The machine 1200 can additionally include a mass storage device 1208 (e.g., a drive unit), a signal generation device 1218 (e.g., a speaker), a network interface device 1220, and one or more sensor(s) 1216, such as a global positioning system (GPS) sensor, compass, accelerometer, or other sensor. The machine 1200 can include an output controller 1228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the hardware processor 1202, the main memory 1204, the static memory 1206, or the mass storage device 1208 can be, or include, a machine-readable media 1222 on which is stored one or more sets of data structures or instructions 1224 (e.g., software) embodying or used by any one or more of the techniques or functions described herein. The instructions 1224 can also reside, completely or at least partially, within any of registers of the hardware processor 1202, the main memory 1204, the static memory 1206, or the mass storage device 1208 during execution thereof by the machine 1200. In an example, one or any combination of the hardware processor 1202, the main memory 1204, the static memory 1206, or the mass storage device 1208 can constitute the machine-readable media 1222. While the machine-readable media 1222 is illustrated as a single medium, the term "machine-readable medium" can include a single medium or multiple media (e.g., a centralized or distributed database, or associated caches and servers) configured to store the one or more instructions 1224.

The term "machine readable medium" can include any medium that is capable of storing, encoding, or carrying instructions for execution by the machine 1200 and that cause the machine 1200 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine-readable media 1222 can be representative of the instructions 1224, such as instructions 1224 themselves or a format from which the instructions 1224 can be derived. This format from which the instructions 1224 can be derived can include source code, encoded instructions (e.g., in compressed or encrypted form), packaged instructions (e.g., split into multiple packages), or the like. The information representative of the instructions 1224 in the machine-readable media 1222 can be processed by processing circuitry into the instructions to implement any of the operations discussed herein. For example, deriving the instructions 1224 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1224.

In an example, the derivation of the instructions 1224 can include assembly, compilation, or interpretation of the information (e.g., by the processing circuitry) to create the instructions 1224 from some intermediate or preprocessed format provided by the machine-readable media 1222. The information, when provided in multiple parts, can be combined, unpacked, and modified to create the instructions 1224. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1224 can be further transmitted or received over a communications network 1226 using a transmission medium via the network interface device 1220 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1220 can include one or more physical jacks (e.g., Ethernet, coaxial, or phone jacks) or one or more antennas to connect to the network 1226. In an example, the network interface device 1220 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1200, and includes digital or analog communications signals or other intangible medium to facilitate communication of such software. A transmission medium is a machine readable medium.

To better illustrate the methods and apparatuses described herein, a non-limiting set of Example embodiments are set forth below as numerically identified Examples.

Example 1 is a system comprising: a first memory-compute node including a device configured to accept a remote call; and a second memory compute node including: a hybrid-threading processor (HTP) including processing circuitry configured to: receive an instruction from a thread for the device, the instruction corresponding to a no-return indication; increase a counter corresponding to the thread based on the no-return indication; continue execution of the thread without waiting for a return value from the device; decrement the counter based on receipt of the return value; and prevent the thread from completing until the counter is zero.

In Example 2, the subject matter of Example 1 includes, wherein, to continue execution of the thread, the processing circuitry is configured to place an identifier of the thread into a ready-to-run queue of the HTP.

In Example 3, the subject matter of Examples 1-2 includes, wherein, to prevent the thread from completing, the processing circuitry is configured to remove a thread return instruction from execution when the counter is greater than zero.

In Example 4, the subject matter of Examples 1-3 includes, wherein the processing circuitry is further configured to: receive the return value; and discard the return value.

In Example 5, the subject matter of Examples 1-4 includes, wherein the device is a memory controller.

In Example 6, the subject matter of Example 5 includes, wherein the instruction is an atomic operation.

In Example 7, the subject matter of Example 6 includes, wherein the return value is a result of the atomic operation.

In Example 8, the subject matter of Examples 6-7 includes, wherein the return value indicates whether the atomic operation completed successfully without including a result of the atomic operation.

In Example 9, the subject matter of Examples 6-8 includes, wherein the atomic operation is a programmable atomic operation.

In Example 10, the subject matter of Examples 1-9 includes, wherein the first memory compute node is the second memory-compute node.

In Example 11, the subject matter of Examples 1-10 includes, wherein the counter is a sole counter used for every no-return instruction of the thread to a device outside of the HTP.

In Example 12, the subject matter of Examples 1-11 includes, wherein the no-return indication is included in the instruction.

In Example 13, the subject matter of Example 12 includes, wherein the no-return indication is a field of the instruction.

In Example 14, the subject matter of Examples 12-13 includes, wherein the no-return indication is a single bit.

In Example 15, the subject matter of Example 14 includes, wherein the single bit is one of several in an operation code field of the instruction.

Example 16 is an apparatus comprising: an interface to a device; and processing circuitry configured to: receive an instruction from a thread for the device, the instruction corresponding to a no-return indication; make a call to the device across the interface in response to receipt of the instruction; increase a counter corresponding to the thread based on the no-return indication; continue execution of the thread without waiting for a return value from the device; decrement the counter based on receipt of the return value; and prevent the thread from completing until the counter is zero.

In Example 17, the subject matter of Example 16 includes, wherein, to continue execution of the thread, the processing circuitry is configured to place an identifier of the thread into a ready-to-run queue of the processor.

In Example 18, the subject matter of Examples 16-17 includes, wherein, to prevent the thread from completing, the processing circuitry is configured to remove a thread return instruction from execution when the counter is greater than zero.

In Example 19, the subject matter of Examples 16-18 includes, wherein the processing circuitry is further configured to: receive the return value; and discard the return value.

In Example 20, the subject matter of Examples 16-19 includes, wherein the device is a memory controller.

In Example 21, the subject matter of Example 20 includes, wherein the instruction is an atomic operation.

In Example 22, the subject matter of Example 21 includes, wherein the return value is a result of the atomic operation.

In Example 23, the subject matter of Examples 21-22 includes, wherein the return value indicates whether the atomic operation completed successfully without including a result of the atomic operation.

In Example 24, the subject matter of Examples 21-23 includes, wherein the atomic operation is a programmable atomic operation.

In Example 25, the subject matter of Examples 16-24 includes, wherein the apparatus is a hybrid threading processor.

In Example 26, the subject matter of Examples 16-25 includes, wherein the counter is a sole counter used for every no-return instruction of the thread to a device outside of the apparatus.

In Example 27, the subject matter of Examples 16-26 includes, wherein the no-return indication is included in the instruction.

In Example 28, the subject matter of Example 27 includes, wherein the no-return indication is a field of the instruction.

In Example 29, the subject matter of Examples 27-28 includes, wherein the no-return indication is a single bit.

In Example 30, the subject matter of Example 29 includes, wherein the single bit is one of several in an operation code field of the instruction.

Example 31 is a method comprising: receiving, by a processor, an instruction from a thread for a device, the instruction corresponding to a no-return indication; increasing, by the processor, a counter corresponding to the thread based on the no-return indication; continuing, by the processor, execution of the thread without waiting for a return value from the device; decrementing, by the processor, the counter based on receipt of the return value; and preventing, by the processor, the thread from completing until the counter is zero.

In Example 32, the subject matter of Example 31 includes, wherein continuing execution of the thread includes placing an identifier of the thread into a ready-to-run queue of the processor.

In Example 33, the subject matter of Examples 31-32 includes, wherein preventing the thread from completing includes removing a thread return instruction from execution when the counter is greater than zero.

In Example 34, the subject matter of Examples 31-33 includes, receiving the return value; and discarding the return value.

In Example 35, the subject matter of Examples 31-34 includes, wherein the device is a memory controller.

In Example 36, the subject matter of Example 35 includes, wherein the instruction is an atomic operation.

In Example 37, the subject matter of Example 36 includes, wherein the return value is a result of the atomic operation.

In Example 38, the subject matter of Examples 36-37 includes, wherein the return value indicates whether the atomic operation completed successfully without including a result of the atomic operation.

In Example 39, the subject matter of Examples 36-38 includes, wherein the atomic operation is a programmable atomic operation.

In Example 40, the subject matter of Examples 31-39 includes, wherein the processor is a hybrid threading processor.

In Example 41, the subject matter of Examples 31-40 includes, wherein the counter is a sole counter used for every no-return instruction of the thread to a device outside of the processor.

In Example 42, the subject matter of Examples 31-41 includes, wherein the no-return indication is included in the instruction.

In Example 43, the subject matter of Example 42 includes, wherein the no-return indication is a field of the instruction.

In Example 44, the subject matter of Examples 42-43 includes, wherein the no-return indication is a single bit.

In Example 45, the subject matter of Example 44 includes, wherein the single bit is one of several in an operation code field of the instruction.

Example 46 is a machine readable media including instructions that, when executed by processing circuitry, cause the processing circuitry to perform operations comprising: receiving an instruction from a thread for a device, the instruction corresponding to a no-return indication; increasing a counter corresponding to the thread based on the no-return indication; continuing execution of the thread without waiting for a return value from the device; decrementing the counter based on receipt of the return value; and preventing the thread from completing until the counter is zero.

In Example 47, the subject matter of Example 46 includes, wherein continuing execution of the thread includes placing an identifier of the thread into a ready-to-run queue of the processor.

In Example 48, the subject matter of Examples 46-47 includes, wherein preventing the thread from completing includes removing a thread return instruction from execution when the counter is greater than zero.

In Example 49, the subject matter of Examples 46-48 includes, wherein the operations further comprise: receiving the return value; and discarding the return value.

In Example 50, the subject matter of Examples 46-49 includes, wherein the device is a memory controller.

In Example 51, the subject matter of Example 50 includes, wherein the instruction is an atomic operation.

In Example 52, the subject matter of Example 51 includes, wherein the return value is a result of the atomic operation.

In Example 53, the subject matter of Examples 51-52 includes, wherein the return value indicates whether the atomic operation completed successfully without including a result of the atomic operation.

In Example 54, the subject matter of Examples 51-53 includes, wherein the atomic operation is a programmable atomic operation.

In Example 55, the subject matter of Examples 46-54 includes, wherein the processor is a hybrid threading processor.

In Example 56, the subject matter of Examples 46-55 includes, wherein the counter is a sole counter used for every no-return instruction of the thread to a device outside of the processor.

In Example 57, the subject matter of Examples 46-56 includes, wherein the no-return indication is included in the instruction.

In Example 58, the subject matter of Example 57 includes, wherein the no-return indication is a field of the instruction.

In Example 59, the subject matter of Examples 57-58 includes, wherein the no-return indication is a single bit.

In Example 60, the subject matter of Example 59 includes, wherein the single bit is one of several in an operation code field of the instruction.

Example 61 is a system comprising: means for receiving, by a processor, an instruction from a thread for a device, the instruction corresponding to a no-return indication; means for increasing, by the processor, a counter corresponding to the thread based on the no-return indication; means for continuing, by the processor, execution of the thread without waiting for a return value from the device; means for decrementing, by the processor, the counter based on receipt of the return value; and means for preventing, by the processor, the thread from completing until the counter is zero.

In Example 62, the subject matter of Example 61 includes, wherein the means for continuing execution of the thread include means for placing an identifier of the thread into a ready-to-run queue of the processor.

In Example 63, the subject matter of Examples 61-62 includes, wherein the means for preventing the thread from completing include means for removing a thread return instruction from execution when the counter is greater than zero.

In Example 64, the subject matter of Examples 61-63 includes, means for receiving the return value; and means for discarding the return value.

In Example 65, the subject matter of Examples 61-64 includes, wherein the device is a memory controller.

In Example 66, the subject matter of Example 65 includes, wherein the instruction is an atomic operation.

In Example 67, the subject matter of Example 66 includes, wherein the return value is a result of the atomic operation.

In Example 68, the subject matter of Examples 66-67 includes, wherein the return value indicates whether the atomic operation completed successfully without including a result of the atomic operation.

In Example 69, the subject matter of Examples 66-68 includes, wherein the atomic operation is a programmable atomic operation.

In Example 70, the subject matter of Examples 61-69 includes, wherein the processor is a hybrid threading processor.

In Example 71, the subject matter of Examples 61-70 includes, wherein the counter is a sole counter used for every no-return instruction of the thread to a device outside of the processor.

In Example 72, the subject matter of Examples 61-71 includes, wherein the no-return indication is included in the instruction.

In Example 73, the subject matter of Example 72 includes, wherein the no-return indication is a field of the instruction.

In Example 74, the subject matter of Examples 72-73 includes, wherein the no-return indication is a single bit.

In Example 75, the subject matter of Example 74 includes, wherein the single bit is one of several in an operation code field of the instruction.

Example 76 is at least one machine-readable medium including instructions that, when executed by processing circuitry, cause the processing circuitry to perform operations to implement of any of Examples 1-75.

Example 77 is an apparatus comprising means to implement of any of Examples 1-75.

Example 78 is a system to implement of any of Examples 1-75.

Example 79 is a method to implement of any of Examples 1-75.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system comprising:
a first memory-compute node including a device configured to accept a remote call; and
a second memory-compute node including:
a hybrid-threading processor (HTP) including processing circuitry configured to:
receive an instruction from a thread for the device, the instruction corresponding to a no-return indication;
increase a counter corresponding to the thread based on the no-return indication;
continue execution of the thread irrespective of a return value from the device;
decrement the counter based on receipt of the return value; and
prevent the thread from completing until the counter is zero by removing a thread return instruction from execution when the counter is greater than zero.

2. The system of claim 1, wherein, to continue execution of the thread, the processing circuitry is configured to place an identifier of the thread into a ready-to-run queue of the HTP.

3. The system of claim 1, wherein the processing circuitry is further configured to:
receive the return value; and
discard the return value.

4. The system of claim 1, wherein the device is a memory controller.

5. The system of claim 4, wherein the instruction corresponding to the no-return indication is an atomic operation.

6. The system of claim 5, wherein the return value is a result of the atomic operation.

7. The system of claim 5, wherein the return value indicates whether the atomic operation completed successfully without including a result of the atomic operation.

8. The system of claim 5, wherein the atomic operation is a programmable atomic operation.

9. The system of claim 1, wherein the first memory-compute node is the second memory-compute node.

10. The system of claim 1, wherein the counter is a sole counter used for every no-return instruction of the thread to a device outside of the HTP.

11. The system of claim 1, wherein the no-return indication is included in the instruction.

12. The system of claim 11, wherein the no-return indication is a single bit.

13. The system of claim 12, wherein the single bit is one of several in an operation code field of the instruction corresponding to the no-return indication.

14. An apparatus comprising:
an interface to a device; and
processing circuitry configured to:
receive an instruction from a thread for the device, the instruction corresponding to a no-return indication;
make a call to the device across the interface in response to receipt of the instruction;
increase a counter corresponding to the thread based on the no-return indication;
continue execution of the thread without waiting for a return value from the device;
decrement the counter based on receipt of the return value; and
prevent the thread from completing until the counter is zero by removing a thread return instruction from execution when the counter is greater than zero.

15. The apparatus of claim 14, wherein, to continue execution of the thread, the processing circuitry is configured to place an identifier of the thread into a ready-to-run queue of the apparatus.

16. The apparatus of claim 14, wherein the device is a memory controller.

17. The apparatus of claim 16, wherein the instruction corresponding to the no-return indication is an atomic operation.

18. The apparatus of claim 17, wherein the return value is a result of the atomic operation.

19. The apparatus of claim 17, wherein the return value indicates whether the atomic operation completed successfully without including a result of the atomic operation.

20. The apparatus of claim 17, wherein the atomic operation is a programmable atomic operation.

21. The apparatus of claim 14, wherein the apparatus is a hybrid threading processor.

22. The apparatus of claim 14, wherein the counter is a sole counter used for every no-return instruction of the thread to a device outside of the apparatus.

23. The apparatus of claim 14, wherein the no-return indication is included in the instruction corresponding to the no-return indication.

24. The apparatus of claim 14, wherein the processing circuitry is further configured to:
receive the return value; and
discard the return value.

* * * * *